(12) United States Patent
Nishiguchi

(10) Patent No.: US 11,353,696 B2
(45) Date of Patent: Jun. 7, 2022

(54) IMAGE FORMING APPARATUS

(71) Applicant: CANON KABUSHIKI KAISHA, Tokyo (JP)

(72) Inventor: Tetsuya Nishiguchi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/195,039

(22) Filed: Mar. 8, 2021

(65) Prior Publication Data

US 2021/0286290 A1  Sep. 16, 2021

(30) Foreign Application Priority Data

Mar. 13, 2020  (JP) .............................. JP2020-044018

(51) Int. Cl.
| | | |
|---|---|---|
| *G02B 26/12* | (2006.01) | |
| *G03G 15/04* | (2006.01) | |
| *G03G 15/28* | (2006.01) | |
| *G03G 15/043* | (2006.01) | |

(52) U.S. Cl.
CPC ......... *G02B 26/125* (2013.01); *G02B 26/127* (2013.01); *G03G 15/0435* (2013.01); *G03G 15/04072* (2013.01); *G03G 15/28* (2013.01)

(58) Field of Classification Search
CPC ............... G02B 26/125; G02B 26/127; G03G 15/04072; G03G 15/0435; G03G 15/28
See application file for complete search history.

(56) References Cited

U.S. PATENT DOCUMENTS

| | | | | |
|---|---|---|---|---|
| 10,241,436 B1* | 3/2019 | Ichikawa | ............. | G03G 15/043 |
| 2008/0232833 A1* | 9/2008 | Shukuya | ............. | G03G 15/326 |
| | | | | 399/38 |
| 2010/0295917 A1* | 11/2010 | Chino | ................. | G02B 26/127 |
| | | | | 347/224 |
| 2011/0286067 A1* | 11/2011 | Iwamatsu | ............ | G02B 26/127 |
| | | | | 359/204.5 |
| 2016/0171350 A1* | 6/2016 | Kobayashi | ........... | G03G 15/043 |
| | | | | 358/1.7 |

FOREIGN PATENT DOCUMENTS

| | | |
|---|---|---|
| JP | H1142813 A | 2/1999 |
| JP | 2001312116 A | 11/2001 |
| JP | 2002273934 A | 9/2002 |
| JP | 2009031504 A | 2/2009 |
| JP | 2011008238 A | 1/2011 |
| JP | 2011257572 A | 12/2011 |
| JP | 2018022164 A | 2/2018 |

\* cited by examiner

*Primary Examiner* — Ryan D Walsh

(74) *Attorney, Agent, or Firm* — Canon U.S.A., Inc. I.P. Division

(57) ABSTRACT

An image forming apparatus, including a photosensitive member, a scanning optical unit configured to scan the photosensitive member by laser light according to image information, a detection unit arranged in a position facing the photosensitive member and configured to output positional information on the laser light. The detection unit includes a detection portion into which the laser light reflected by the photosensitive member is incident, and a control unit configured to calculate a positional deviation amount of an irradiation position on the photosensitive member which is irradiated by the laser light based on the positional information output by the detection unit, and control the scanning optical unit to correct the positional deviation of the irradiation position of the laser light.

4 Claims, 13 Drawing Sheets

MAIN SCANNING DIRECTION

IMAGE FORMING APPARATUS

BACKGROUND

Field of the Disclosure

The present disclosure relates to an electrophotographic image forming apparatus.

Description of the Related Art

In a scanning optical device used for an electrophotographic image forming apparatus, for example, a laser beam printer, laser light emitted from a light source based on an image signal has an optical path deflected by a rotary polygon mirror. Then, the deflected laser light is transmitted through a scanning lens, and scans a surface of a photosensitive drum, to thereby form an electrostatic latent image on the photosensitive drum. The temperature inside the image forming apparatus rises due to operations of the scanning optical device and devices inside the image forming apparatus. In accordance with this temperature rise, a position at which the photosensitive drum is irradiated with the laser light emitted from the scanning optical device may deviate in a scanning direction of the laser light or in a direction perpendicular to the scanning direction. When the position at which the laser light is emitted onto the photosensitive drum changes, a position of the electrostatic latent image formed on the photosensitive drum also changes, and a position of a toner image obtained by developing the electrostatic latent image with toner also changes, to thereby cause a position of an image formed on a recording material to deviate from a predetermined position as well. In addition, in a case of a color image, a color image is formed by superimposing toner images of a plurality of colors. However, when a position of the toner image of each color changes, a color tint of a formed color image changes.

In view of this, in Japanese Patent Application Laid-Open No. 2001-312116, there is proposed an image forming apparatus configured to form a positional deviation detection pattern image on a conveying body and read the positional deviation detection pattern image formed on the conveying body by a detector to calculate a positional deviation amount. In Japanese Patent Application Laid-Open No. 2002-273934, there is proposed an image forming apparatus configured to scan laser light over a marking in a marking area, which is provided to a place other than a photosensitive surface of a photosensitive drum, to thereby detect a writing position of the laser light on the photosensitive drum and correct the writing position of the laser light. In Japanese Patent Application Laid-Open No. 2011-257572, there is proposed a scanning optical device configured to cause a light flux entering a photosensitive drum to be reflected by a beam splitter to enter a position detection sensor, which is provided to an effective scanning area of the photosensitive drum, to thereby detect a position of the light flux. In Japanese Patent Application Laid-Open No. 2018-22164, there is proposed an image forming apparatus configured to appropriately correct a positional deviation between beams to suppress an occurrence of image adverse effects including moire.

However, the image forming apparatus proposed in the above-mentioned patent literatures may have the following consequences. For example, in the image forming apparatus proposed in Japanese Patent Application Laid-Open No. 2001-312116, the positional deviation detection pattern image is formed on the conveying body, and hence toner is adversely consumed every time positional deviation detection is performed. In addition, the positional deviation detection pattern image cannot be formed on the conveying body when printing is being performed on a recording material. For that reason, the positional deviation detection is required to be performed at a time other than a time of printing, and hence printing cannot be performed while the positional deviation detection is being performed. This leads to an occurrence of downtime. Further, in the image forming apparatus proposed in Japanese Patent Application Laid-Open No. 2002-273934, the marking area is provided to the place other than the photosensitive surface, and the marking area is irradiated with laser light, and an intensity of a reflected return light is detected, to thereby detect the writing position of the laser light. This requires the scanning optical device to emit the laser light to an area outside of the image area. As a result, a length of the photosensitive drum in a longitudinal direction thereof increases, causing the image forming apparatus to become larger in size. Further, in the scanning optical device proposed in Japanese Patent Application Laid-Open No. 2011-257572, the laser light used to irradiate an area in which image information is to be written is split by the beam splitter. This may reduce an amount of light emitted onto the surface of the photosensitive drum, might necessitate the use of a semiconductor laser with higher output. Thus, the use of a beam splitter and a semiconductor laser with high power may cause an increase in cost.

SUMMARY

The present disclosure has been made in view of the above-mentioned circumstances, and has aspects to suppress an increase in size of an image forming apparatus and an occurrence of downtime, which can be involved in detection and correction of an irradiation position deviation of laser light on a photosensitive member.

According to an embodiment of the present disclosure, there is provided an image forming apparatus, comprising; a photosensitive member; a scanning optical unit configured to scan the photosensitive member by laser light according to image information, the scanning optical unit including a light source configured to emit the laser light, a rotary polygon mirror configured to deflect the laser light, and a housing configured to hold the light source and the rotary polygon mirror; a control unit configured to control the scanning optical unit; and a detection unit which is arranged in a position facing the photosensitive member, and is configured to output positional information on the laser light, the detection unit including a detection portion into which the laser light reflected by the photosensitive member is incident, wherein the control unit calculates a positional deviation amount of an irradiation position on the photosensitive member which is irradiated by the laser light based on the positional information output by the detection unit, and controls the scanning optical unit to correct the positional deviation of the irradiation position of the laser light.

Further features of the present disclosure will become apparent from the following description of exemplary embodiments with reference to the attached drawings.

DESCRIPTION OF THE EMBODIMENTS

Now, embodiments of the present disclosure are described in detail with reference to the drawings. In the following description, like components are denoted by like reference symbols.

First Embodiment

[Configuration of Image Forming Apparatus]

Figure 1:
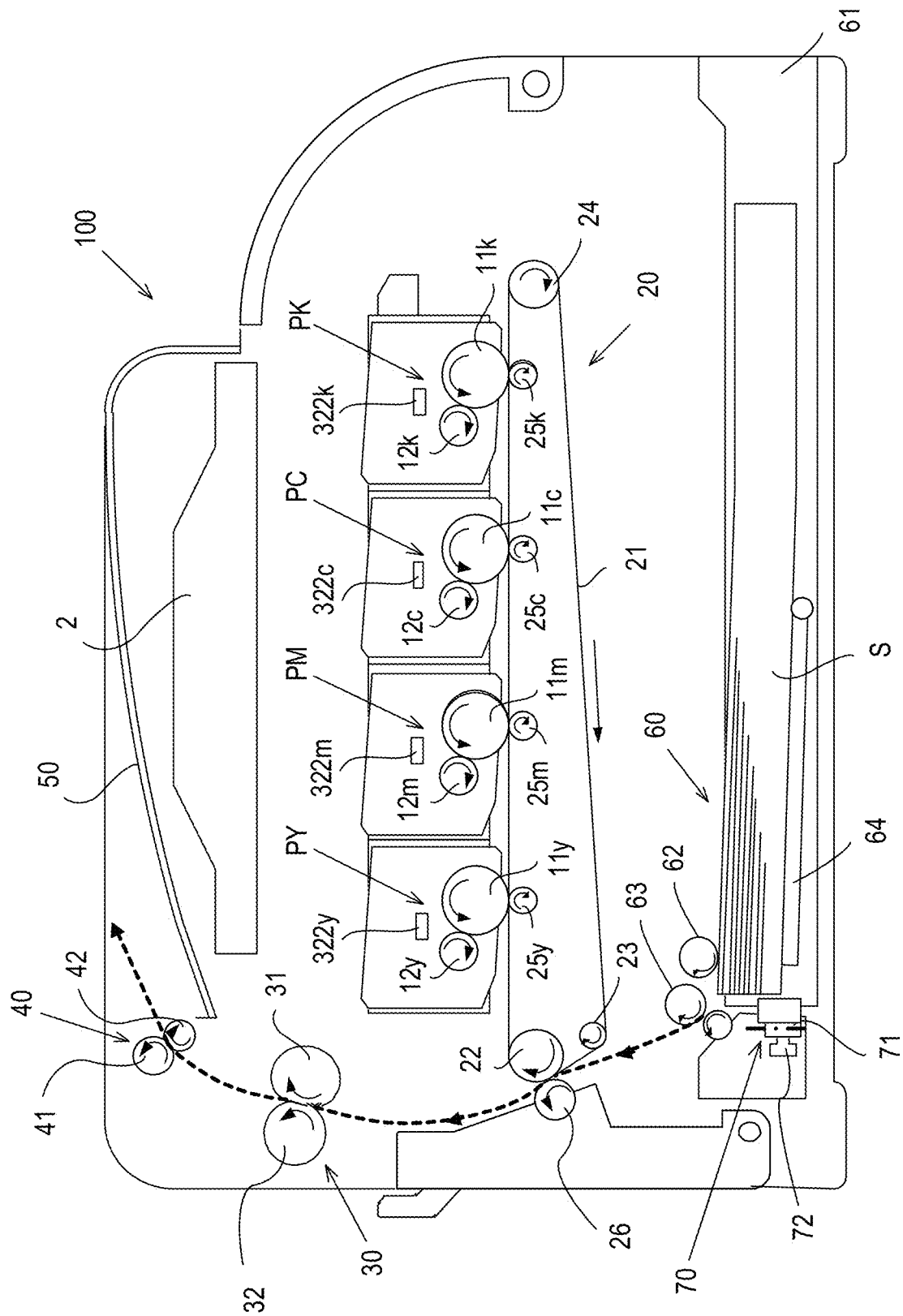
FIG. 1 is a cross-sectional view for illustrating a configuration of an image forming apparatus according to each of a first embodiment, a second embodiment, and a third embodiment.

FIG. 1 is a cross-sectional view for illustrating a configuration of a laser beam printer 100 (hereinafter referred to as "printer 100") being an electrophotographic image forming apparatus according to a first embodiment. The printer 100 is configured to form an image on a sheet S being a recording medium based on image information input from an external host apparatus (not shown), for example, a personal computer (PC). Inside an apparatus main body of the printer 100, four process cartridges PY, PM, PC, and PK having different toner colors are arranged side by side in a substantially horizontal direction. The process cartridges PY, PM, PC, and PK are process cartridges having the toner colors of yellow (Y), magenta (M), cyan (C), and black (K), respectively. In FIG. 1, suffixes "y," "m," "c," and "k" of reference symbols attached to members indicate that the members correspond to the process cartridges PY, PM, PC, and PK having the toner colors of yellow, magenta, cyan, and black, respectively. The process cartridges PY, PM, PC, and PK each have the same internal configuration, and in the following description, the suffixes "y," "m," "c," and "k" of the reference symbols are omitted except in description regarding the members of the process cartridge of a specific color. Each arrow of FIG. 1 indicates a rotational direction of a member involving the arrow.

The process cartridges PY, PM, PC, and PK are each obtained by integrally assembling a photosensitive drum 11 being a photosensitive member configured to have an electrostatic latent image formed thereon, a developing roller 12 configured to form a toner image by causing toner to adhere to the electrostatic latent image formed on the photosensitive drum 11, and developing toner. In addition, a scanning optical device 2 is arranged above the process cartridges PY, PM, PC, and PK. The scanning optical device 2 is configured to scan laser light over a surface of the photosensitive drum 11 of each of the process cartridges PY, PM, PC, and PK to form an electrostatic latent image on the surface of the photosensitive drum 11. Then, the electrostatic latent image formed on the photosensitive drum 11 (on the photosensitive member) is developed by the developing roller 12 to form a toner image.

Meanwhile, an intermediate transfer belt unit 20 is arranged below the process cartridges PY, PM, PC, and PK. In the intermediate transfer belt unit 20, an intermediate transfer belt 21 is suspended in a tensioned state around a drive roller 22, a tension roller 23, and a driven roller 24 to be rotated in a direction (clockwise) indicated by the arrow of FIG. 1. The photosensitive drum 11 of each of the process cartridges PY, PM, PC, and PK is in contact with the intermediate transfer belt 21. Inside the intermediate transfer belt 21, a primary transfer roller 25 is arranged at a position facing the photosensitive drum 11 of each of the process cartridges PY, PM, PC, and PK. The drive roller 22 is in abutment against a secondary transfer roller 26 across the intermediate transfer belt 21. A fixing device 30 and a delivery device 40 are arranged above the secondary transfer roller 26. A stacking tray 50 for stacking delivered sheets S thereon is provided to an external upper surface of the printer 100. The fixing device 30 includes a fixing film 31 and a pressure roller 32. The delivery device 40 includes a delivery drive roller 41 and a delivery driven roller 42.

A feeding device 60 configured to feed a recording material includes a feed tray 61 for placing the sheet S therein. The sheet S placed in the feed tray 61 is brought into abutment against a feed roller 62 by a lift-up mechanism 64, and is fed by the feed roller 62 being rotated in a direction (clockwise) indicated by the arrow of FIG. 1. Further, the multi-fed sheets S are separated by separation rollers 63, and the separated sheet S is conveyed to the secondary transfer roller 26. The sheet S fed from the feeding device 60 is conveyed to a nip portion between the drive roller 22 and the secondary transfer roller 26. Then, the toner image formed on the photosensitive drum 11 and transferred onto the intermediate transfer belt 21 is transferred onto the sheet S at the nip portion between the drive roller 22 and the secondary transfer roller 26. After that, the sheet S having the toner image transferred thereto is conveyed to the fixing device 30 and heated and pressurized by the fixing film 31 and the pressure roller 32 of the fixing device 30, and the toner image is fixed to the sheet S. The sheet S having the toner image fixed thereto is conveyed to the delivery device 40 to be delivered to the stacking tray 50 by the delivery drive roller 41 and the delivery driven roller 42. The broken line illustrated in FIG. 1 indicates a conveyance path for conveying the sheet S fed from the feeding device 60. In addition, a sheet size detection device 70 is arranged in the feeding device 60. The sheet size detection device 70 includes a sheet detection lever 71 and an optical sensor 72, and is configured to detect the size of the sheet S placed in the feed tray 61. The feed tray 61 has a configuration detachably attachable to a main body of the printer 100.

In each of the process cartridges PY, PM, PC, and PK, there is also arranged a sensor unit 322 configured to detect laser light emitted from the scanning optical device 2 onto the photosensitive drum 11 and reflected by the surface of the photosensitive drum 11. The sensor unit 322 is described later.

[Configuration of Scanning Optical Device (Scanning Optical Unit)]

Figure 2:
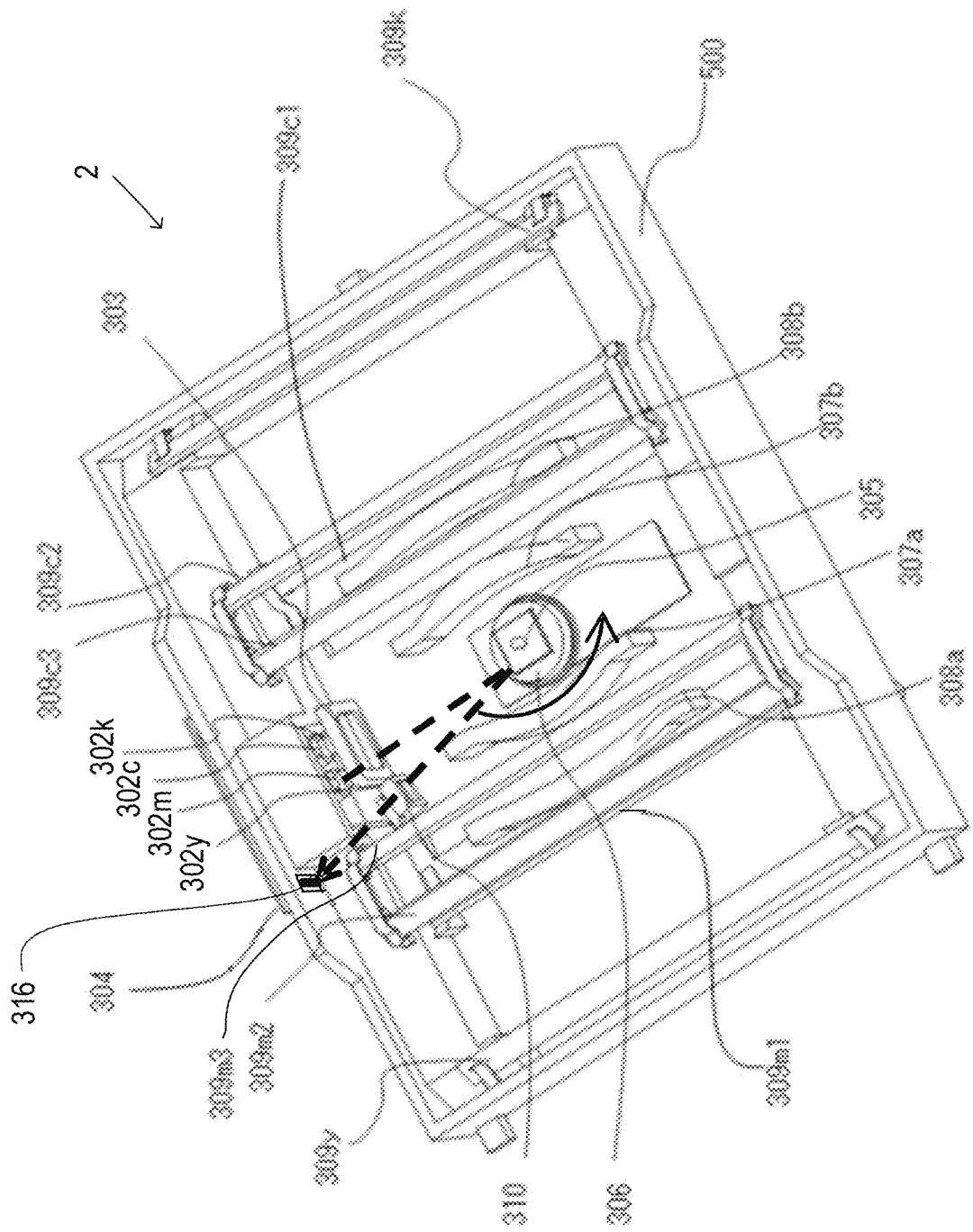
FIG. 2 is a perspective view for illustrating a configuration of a scanning optical device in each of the first embodiment to the third embodiment.

FIG. 2 is a perspective view for illustrating an internal configuration of the scanning optical device 2 illustrated in FIG. 1 when viewed from above. In order to show the internal configuration of the scanning optical device 2, FIG. 2 is illustrated as a perspective view with an upper cover of the scanning optical device 2 having been removed. Meanwhile, FIG. 3 is a cross-sectional view for illustrating the scanning optical device 2 illustrated in FIG. 2.

In FIG. 2, light source portions 302y, 302m, 302c, and 302k include semiconductor lasers (not shown) and collimator lenses (not shown) configured to irradiate the photosensitive drums 11 of the process cartridges PY, PM, PC, and PK with laser light, respectively. A compound-eye cylindrical lens 303 is configured to cause laser light transmitted through the collimator lens of each light source portion 302 to form an image on a rotary polygon mirror 305 described later in a focal-line shape. A laser driving circuit substrate 304 is configured to control driving of the semiconductor laser of each light source portion 302. The rotary polygon mirror 305 includes a reflecting surface for deflecting an optical path of the laser light emitted from each light source portion 302. A motor 306 is configured to drive the rotary polygon mirror 305 to rotate.

Scanning lenses 308a and 308b and fθ lenses 307a and 307b are configured to condense the laser light on the photosensitive drum 11 so that the laser light deflected by the reflecting surface of the rotary polygon mirror 305 forms a spot on the surface of the photosensitive drum 11 of each of the process cartridges PY, PM, PC, and PK. The fθ lenses 307a and 307b and the scanning lenses 308a and 308b are also designed so that a scanning speed of the spot formed on the photosensitive drum 11 becomes a constant speed.

Figure 3:
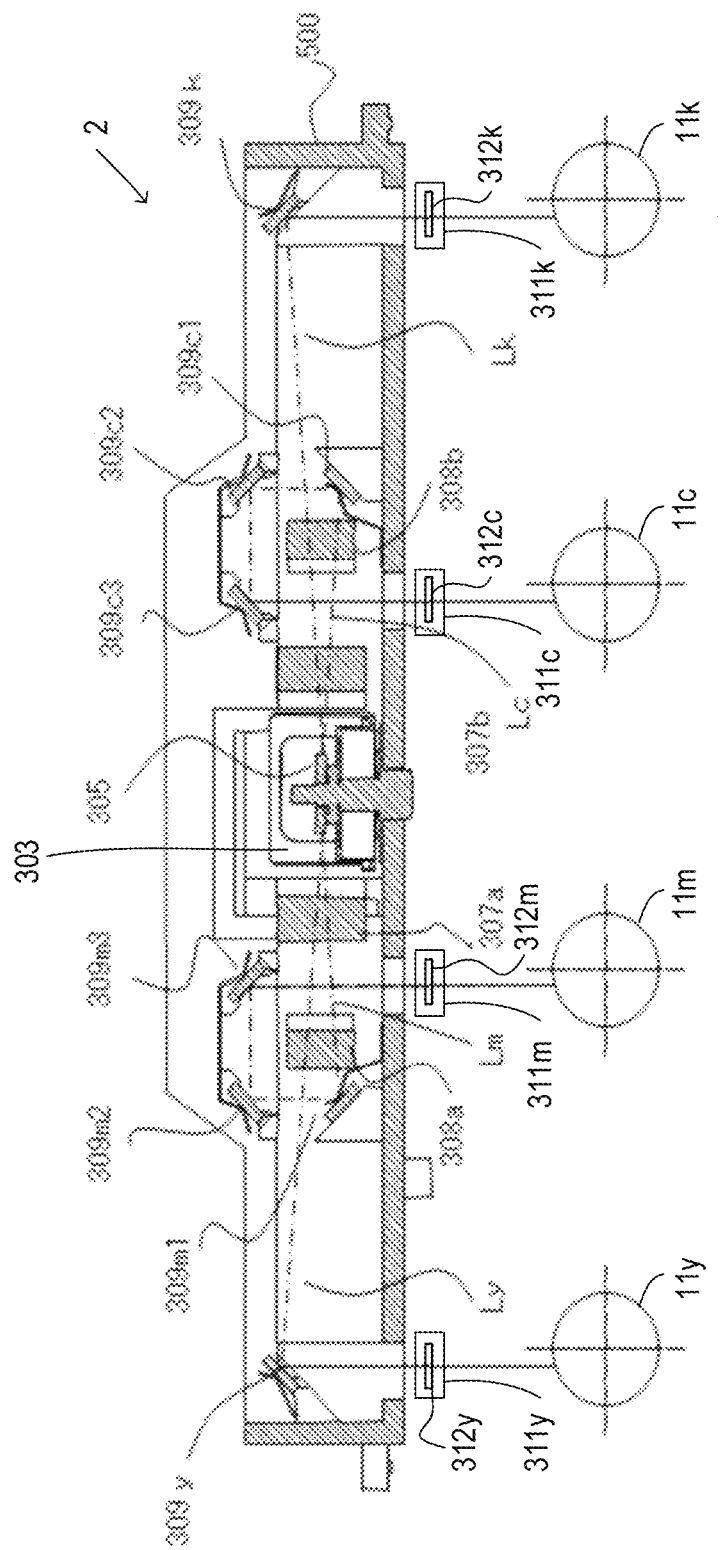
FIG. 3 is a cross-sectional view for illustrating the configuration of the scanning optical device in each of the first embodiment to the third embodiment.

A reflective mirror 309y is a mirror for guiding a laser light Ly emitted from the light source portion 302y, which is illustrated in FIG. 3, to the photosensitive drum 11y of the process cartridge PY. Reflective mirrors 309m1, 309m2, and 309m3 are mirrors for guiding a laser light Lm emitted from the light source portion 302m, which is illustrated in FIG. 3, to the photosensitive drum 11m of the process cartridge PM. Reflective mirrors 309c1, 309c2, and 309c3 are mirrors for guiding a laser light Lc emitted from the light source portion 302c, which is illustrated in FIG. 3, to the photosensitive drum 11c of the process cartridge PC. A reflective mirror 309k is a mirror for guiding a laser light Lk emitted from the light source portion 302k, which is illustrated in FIG. 3, to the photosensitive drum 11k of the process cartridge PK.

Figure 5A:
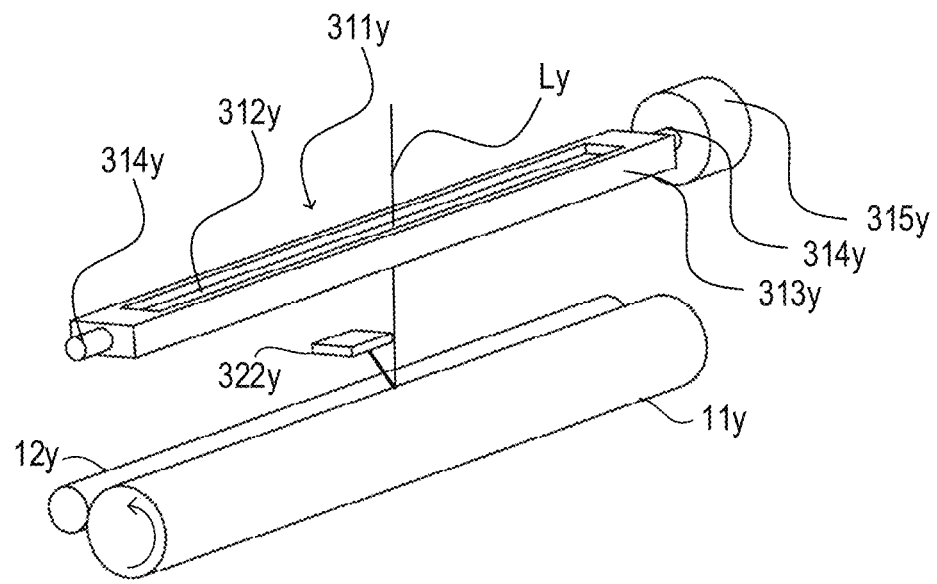
FIG. 5A is a perspective view for illustrating an optical path changing member in each of the first embodiment and the second embodiment.

A condenser lens 310 is a lens for guiding the laser light Ly to a beam detector (BD) 316 provided on the laser driving circuit substrate 304 and configured to output a horizontal synchronization signal. An optical path changing member 311 illustrated in FIG. 3 holds a flat glass 312, which is illustrated in FIG. 5A. A laser light L irradiating the photosensitive drum 11 of each of the process cartridges PY, PM, PC, and PK is transmitted through the flat glass 312. An optical box 500 is a housing for accommodating each member of a scanning optical system of the scanning optical device 2 described above. The above-mentioned optical parts are incorporated into the optical box 500, and the optical box 500 is substantially sealed by a dust intrusion prevention lid (not shown). As illustrated in FIG. 1, the scanning optical device 2 is mounted inside the printer 100.

As described above, the laser light L emitted from the light source portion 302 is transmitted through the compound-eye cylindrical lens 303, and has the optical path deflected by the rotary polygon mirror 305.

In FIG. 3, the laser light Ly emitted from the semiconductor laser of the light source portion 302y is deflected by the rotary polygon mirror 305 and transmitted through the fθ lens 307a and the scanning lens 308a, and has the optical path folded back by the reflective mirror 309y. Then, the laser light Ly is transmitted through a flat glass 312y of an optical path changing member 311y, which is illustrated in FIG. 5A, to irradiate the photosensitive drum 11y of the process cartridge PY.

The laser light Lm emitted from the semiconductor laser of the light source portion 302m is deflected by the rotary polygon mirror 305 and transmitted through the fθ lens 307a and the scanning lens 308a, and has the optical path folded back by the reflective mirrors 309m1, 309m2, and 309m3. Then, the laser light Lm is transmitted through a flat glass 312m of an optical path changing member 311m to irradiate the photosensitive drum 11m of the process cartridge PM.

The laser light Lc emitted from the semiconductor laser of the light source portion 302c is deflected by the rotary polygon mirror 305 and transmitted through the fθ lens 307b and the scanning lens 308b, and has the optical path folded back by the reflective mirrors 309c1, 309c2, and 309c3. Then, the laser light Lc is transmitted through a flat glass 312c of an optical path changing member 311c to irradiate the photosensitive drum 11c of the process cartridge PC.

The laser light Lk emitted from the semiconductor laser of the light source portion 302k is deflected by the rotary polygon mirror 305 and transmitted through the fθ lens 307b and the scanning lens 308b, and has the optical path folded back by the reflective mirror 309k. Then, the laser light Lk is transmitted through a flat glass 312k of an optical path changing member 311k to irradiate the photosensitive drum 11k of the process cartridge PK.

In this manner, the scanning optical system scans the photosensitive drums 11y, 11m, 11c, and 11k with the laser lights Ly, Lm, Lc, and Lk to form scanning lines. A scanning direction at this time is referred to as "main scanning direction" (second direction). Meanwhile, each photosensitive drum 11 is rotated to form an electrostatic latent image on the photosensitive drum 11. A direction of the photosensitive drum 11 rotated at this time is referred to as "sub-scanning direction" (first direction).

As illustrated in FIG. 2, the laser light Ly emitted from the semiconductor laser of the light source portion 302y is deflected by the rotary polygon mirror 305, and the deflected laser light Ly passes through the condenser lens 310 on an upstream side of a position for entering the fθ lens 307a in the main scanning direction. Then, the laser light Ly that has passed through the condenser lens 310 irradiates the BD 316. The BD 316 detects the laser light Ly, to thereby output a horizontal synchronization signal indicating a timing for the laser light Ly to irradiate the photosensitive drum 11y. The condenser lens 310 and the BD 316 are provided only on the semiconductor laser side corresponding to the light source portion 302y. The semiconductor laser of each of the light source portions 302*m*, 302*c*, and 302*k* corresponding to the other toner colors has its emission timing controlled based on a signal output from the BD 316.

[Control of Scanning Optical Device]

Figure 4A:
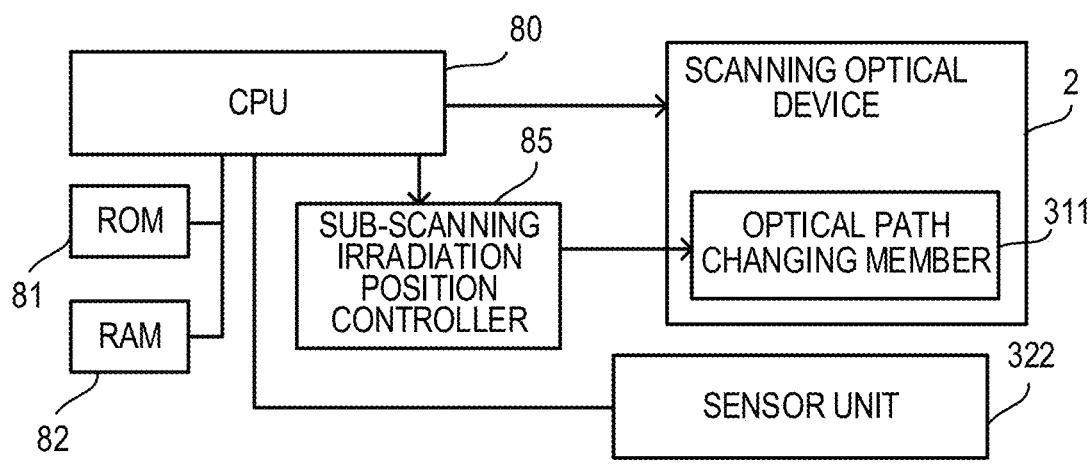
FIG. 4A, FIG. 4B, FIG. 4C, and FIG. 4D are diagrams for illustrating a relationship among a sensor unit, a photosensitive drum, and laser light in the first embodiment.

FIG. 4A is a diagram for illustrating a configuration of a control system configured to control the scanning optical device in the first embodiment. A CPU 80 being a control unit includes a ROM 81 and a RAM 82 being storage units, and is configured to control an image forming operation of the printer 100. The CPU 80 also includes a timer for measuring time. The CPU 80 is configured to perform image formation control in accordance with a control program stored in the ROM 81. In addition, the ROM 81 stores data, parameters, and other information required for various kinds of control. The RAM 82 is configured to temporarily store the control data acquired from each device included in the printer 100, and is also used as a work area for arithmetic operation processing accompanying execution of the control program. The CPU 80 is further configured to acquire detection information obtained as a result of detection performed by the sensor unit 322. The CPU 80 instructs a sub-scanning irradiation position controller 85 to correct an angle of the optical path changing member 311 based on the detection information acquired from the sensor unit 322. The correction of the angle of the optical path changing member 311 is described later.

[Configuration of Sensor Unit]

Figure 4B:
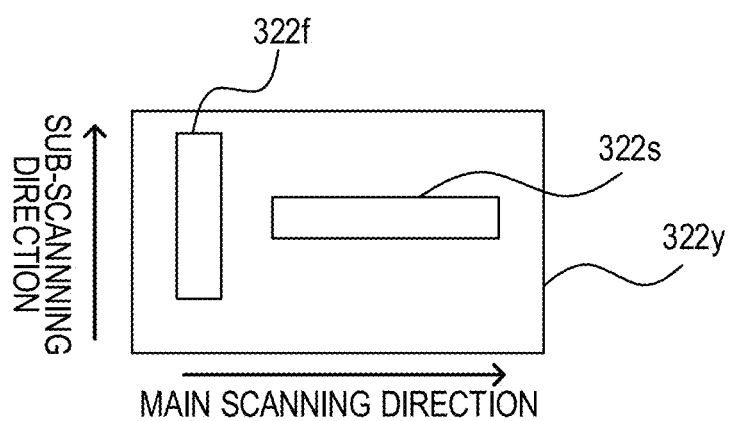
Figure 4C:
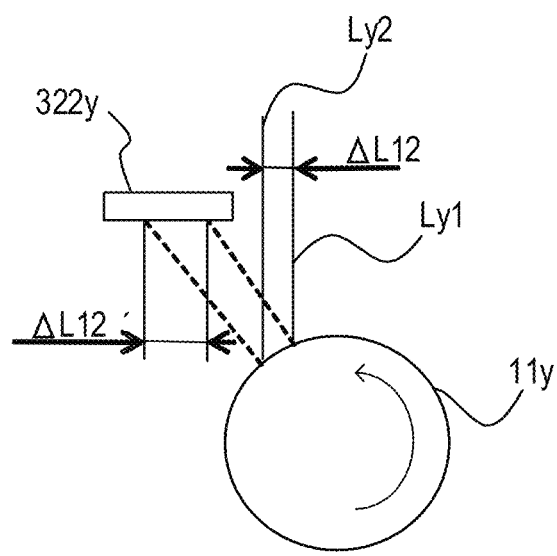
Figure 4D:
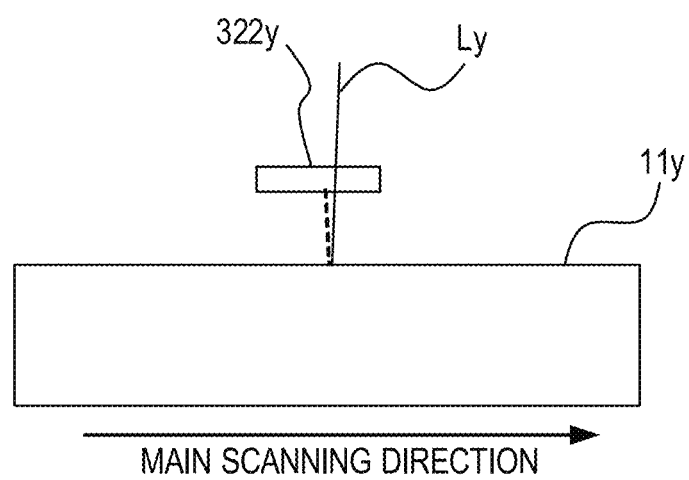

Next, FIG. 4B, FIG. 4C, and FIG. 4D are diagrams for illustrating a positional relationship among the photosensitive drum 11, the laser light L, and the sensor unit 322 being a detector configured to measure a scanning line position of the laser light emitted from the scanning optical device 2. FIG. 4B is a diagram for illustrating an arrangement of line sensors 322*f* and 322*s* being detection portions provided inside the sensor unit 322. FIG. 4C is a diagram for illustrating the positional relationship among the sensor unit 322, the photosensitive drum 11, and the laser light L as viewed when the process cartridge PY is cut along a plane perpendicular to a rotation shaft of the photosensitive drum 11*y*. FIG. 4D is a diagram for illustrating the positional relationship among the sensor unit 322, the photosensitive drum 11, and the laser light L when the process cartridge PY is cut along a plane parallel to the rotation shaft of the photosensitive drum 11*y*. As described above, the printer 100 in the first embodiment includes the four process cartridges PY, PM, PC, and PK. The process cartridges PY, PM, PC, and PK have the same positional relationship among the photosensitive drum 11, the sensor unit 322, and the laser light L irradiating the photosensitive drum 11. In the following description, a case of the process cartridge PY is described as a representative.

As illustrated in FIG. 4B, a sensor unit 322*y* includes the line sensors 322*f* and 322*s*. The line sensor 322*f* (first line sensor) is a line sensor configured to measure an irradiation position of the laser light Ly with respect to the photosensitive drum 11*y* in the sub-scanning direction, and is arranged so that its longitudinal direction becomes the sub-scanning direction perpendicular to the scanning direction (main scanning direction) of the laser light. Meanwhile, the line sensor 322*s* (second line sensor) is a line sensor configured to measure an irradiation position of the laser light Ly with respect to the photosensitive drum 11*y* in the main scanning direction, and is arranged such that its longitudinal direction becomes parallel to the scanning direction (main scanning direction) of the laser light Ly.

As illustrated in FIG. 4C and FIG. 4D, the sensor unit 322*y* is arranged in a vicinity of the photosensitive drum 11*y* near a central portion of the photosensitive drum 11*y* in the main scanning direction. In FIG. 4C, the laser light Ly1 indicates the optical path of the laser light Ly irradiating the photosensitive drum 11*y* from the scanning optical device 2 at the time of shipment of the printer 100. The laser light Ly2 indicates the optical path of the laser light Ly irradiating the photosensitive drum 11*y* from the scanning optical device 2 when a predetermined time period has elapsed since start of an operation of the printer 100 (at a timing after the printer is installed in a place for use by a user). In FIG. 4C and FIG. 4D, the laser lights Ly1 and Ly2 indicated by the solid lines are laser lights obtained before being reflected by the surface of the photosensitive drum 11*y*, and the laser lights Ly1 and Ly2 indicated by the broken lines are laser lights obtained after being reflected by the surface of the photosensitive drum 11*y*. The laser lights Ly1 and Ly2 mirror-reflected by the surface of the photosensitive drum are incident into the line sensor 322*f*, of the sensor unit 322*y*, configured to measure the irradiation position of the laser light Ly2 in the sub-scanning direction and the line sensor 322*s* configured to measure the irradiation position in the main scanning direction. In the first embodiment, first, the irradiation position of the laser light Ly2 in the sub-scanning direction is corrected based on the irradiation position of the laser light Ly2 in the sub-scanning direction detected by the line sensor 322*f*. After that, the irradiation position of the laser light Ly in the main scanning direction is corrected based on the irradiation position of the laser light Ly2 in the main scanning direction detected by the line sensor 322*s*. A method of correcting the irradiation positions of the laser light L in the sub-scanning direction and the main scanning direction is described later.

The irradiation position of the laser light L in the sub-scanning direction is first corrected because of the arrangement positions of the line sensors 322*f* and 322*s* of the sensor unit 322. That is, the line sensor 322*f* configured to detect the irradiation position of the laser light L in the sub-scanning direction is arranged so as to be perpendicular to the main scanning direction of the laser light L. Thus, even when there has occurred an irradiation position deviation of the scanning line, which is a locus of the laser light L in the main scanning direction, the laser light L reflected by the surface of the photosensitive drum 11 reaches the line sensor 322*f* to be detected by the line sensor 322*f*. Meanwhile, the line sensor 322*s* configured to detect the irradiation position of the laser light L in the main scanning direction is arranged so as to be parallel to the scanning direction (main scanning direction) of the laser light L. Thus, when the scanning line of the laser light L greatly deviates in the sub-scanning direction, the irradiation position cannot be detected.

In FIG. 4C, an irradiation position deviation amount $\Delta L12$ indicates an irradiation position deviation amount of the laser light Ly2 on the photosensitive drum 11*y* with respect to the laser light Ly1. Meanwhile, an irradiation position deviation amount $\Delta L12'$ indicates an irradiation position deviation amount of the laser light Ly2 on the line sensor 322*f* with respect to the laser light Ly1. The photosensitive drum 11*y* has a curvature. As illustrated in FIG. 4C, the irradiation position deviation amount $\Delta L12'$ is not the same deviation amount as the irradiation position deviation amount $\Delta L12$ on the photosensitive drum 11. In view of this, the ROM 81 stores, in advance, a correction table of data obtained by associating the irradiation position deviation amount $\Delta L12'$ and the irradiation position deviation amount $\Delta L12$ with each other. Specifically, a detection position, obtained when the line sensor 322*f* detects the laser light L emitted from the scanning optical device 2 to the photosensitive drum 11, at the time of shipment of the printer 100 (when the printer is manufactured at a factory) is used as a reference position. The correction table is formed of data (first information) obtained by associating the irradiation position deviation amount ΔL12', which is the deviation amount detected by the line sensor 322f after the printer is installed, with the irradiation position deviation amount ΔL12 on the photosensitive drum 11. As a result, the irradiation position deviation amount ΔL12 can be obtained from the correction table by acquiring the data corresponding to the irradiation position of the laser light L detected by the line sensor 322f. The CPU 80 acquires the irradiation position of the laser light L detected by the line sensor 322f of the sensor unit 322, obtains the amount of deviation of the irradiation position on the photosensitive drum 11 based on the data in the correction table, and corrects the irradiation position deviation of the laser light L in the sub-scanning direction.

[Correction of Irradiation Position Deviation of Laser Light in Sub-Scanning Direction]

Next, a method of correcting the irradiation position of the laser light L in the sub-scanning direction is described with reference to FIG. 5A and FIG. 5B. FIG. 5A is a perspective view for illustrating a configuration of the optical path changing member 311 for changing the irradiation position of the laser light L in the sub-scanning direction, which is illustrated in FIG. 3, and indicates a positional relationship among the optical path changing member 311, the photosensitive drum 11, and the sensor unit 322. As illustrated in FIG. 3, the optical path changing members 311y, 311m, 311c, and 311k are arranged between the photosensitive drums 11 of the process cartridges PY, PM, PC, and PK and the reflective mirrors 309 of the scanning optical device 2, respectively. The four optical path changing members 311y, 311m, 311c, and 311k have the same mechanism and operation. In the following description, the optical path changing member 311y corresponding to the photosensitive drum 11y of the process cartridge PY is described as a representative.

As illustrated in FIG. 5A, the optical path changing member 311y is formed of the flat glass 312y that transmits the laser light Ly and a holding member 313y configured to hold the flat glass 312y. Rotation shafts 314y configured to rotate the holding member 313y are provided at both end portions of the holding member 313y in the longitudinal direction (main scanning direction) with one end being held by the scanning optical device 2 and the other end being rotatably held by a stepping motor 315y being a drive member. Then, the stepping motor 315y is rotated in response to an instruction from the sub-scanning irradiation position controller 85 illustrated in FIG. 4A, to thereby rotate the flat glass 312y. Thus, it is possible to change the irradiation position of the laser light Ly with respect to the photosensitive drum 11y.

Figure 5B:
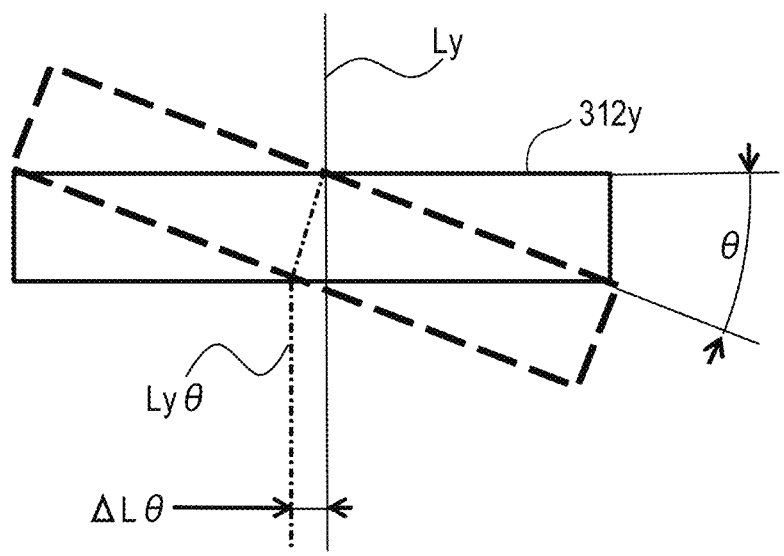
FIG. 5B is a diagram for illustrating a relationship between rotation of a flat glass and a change of the laser light in each of the first embodiment and the second embodiment.

FIG. 5B is a diagram for illustrating a change in irradiation position of the photosensitive drum 11y irradiated by the laser light Ly when the flat glass 312y held by the optical path changing member 311y is rotated by the stepping motor 315y. FIG. 5B is a diagram for illustrating the flat glass 312y in a state in which the flat glass 312y is viewed from the stepping motor 315y side toward the main scanning direction. In the first embodiment, laser light irradiation positions in the sub-scanning direction are uniformly corrected at all image heights. As illustrated in FIG. 5B, a surface of the flat glass 312y entered by the laser light Ly and a surface exited by the laser light Ly are parallel to each other. Thus, when the flat glass 312 indicated by the solid line is tilted by an angle θ in the sub-scanning direction (up-down direction in FIG. 5B), the laser light Ly entering the flat glass 312y indicated by the broken line travels from an entrance surface of the flat glass 312y in a direction tilted by the angle θ which is indicated by the one-dot chain line in FIG. 5B. Then, a laser light Lyθ emitted from an exit surface of the flat glass 312y travels in an optical path parallel to the laser light Ly traveling before entering the flat glass 312y. As a result, as illustrated in FIG. 5B, the flat glass 312y is tilted by the angle θ clockwise in FIG. 5B when viewed from the stepping motor 315y, to thereby be able to shift the position for the laser light Ly to irradiate the photosensitive drum 11y by ΔLθ in the sub-scanning direction of the photosensitive drum 11y. For that reason, the ROM 81 of the CPU 80 stores a correction table having data (second information) obtained by associating the irradiation position deviation amount ΔL12 on the photosensitive drum 11, which is illustrated in FIG. 4C, with the angle θ to be used for changing the angle of the flat glass 312, for correcting the irradiation position deviation amount ΔL12.

When correcting the irradiation position of the laser light L on the photosensitive drum 11 in the sub-scanning direction, the CPU 80 first acquires the detection position of the laser light L detected by the line sensor 322f of the sensor unit 322. Then, the CPU 80 uses the correction table stored in the ROM 81 to acquire a positional deviation amount on the photosensitive drum 11 corresponding to the deviation amount from the reference position based on the detection position of the laser light L obtained by the line sensor 322f. Subsequently, in order to correct the acquired positional deviation amount on the photosensitive drum 11, the CPU 80 acquires an angle to be used for changing the angle of the flat glass 312 from the correction table stored in the ROM 81. Then, the CPU 80 instructs the sub-scanning irradiation position controller 85 about the acquired angle to be used for changing the angle of the flat glass 312. The sub-scanning irradiation position controller 85 controls the stepping motor 315 to change the angle of the flat glass 312 to the instructed angle, to thereby complete the correction of the laser light L in the sub-scanning direction. The above-mentioned correction operation is performed for each of the process cartridges PY, PM, PC, and PK, to thereby perform the correction of the laser light L in the sub-scanning direction.

In this case, the sub-scanning irradiation position controller 85 controls the stepping motor 315 configured to change the angle of the flat glass 312, but the CPU 80 may directly control the stepping motor 315. When the stepping motor 315 is driven to change the angle of the flat glass 312 during the image formation of the sheet S, the irradiation position on the photosensitive drum 11 irradiated by the laser light L deviates, and the formed electrostatic latent image is distorted in the sub-scanning direction. For that reason, the angle of the flat glass 312 is changed at a timing at which an image is not being formed, i.e., in a sheet gap between the sheet S and the next sheet S at the time of printing. This prevents an occurrence of downtime involved in the detection and correction of the irradiation position deviation.

In the first embodiment, the correction table is used to correct the irradiation position deviation of the laser light L in the sub-scanning direction. For example, the detection position obtained when the line sensor 322f detects the laser light L emitted from the scanning optical device 2 to the photosensitive drum 11 at the time of shipment of the printer 100 is stored in the ROM 81 in advance as an initial irradiation position of the laser light L. Then, the irradiation position of the laser light L on the photosensitive drum 11 may be changed by a fixed amount each time the angle of the flat glass 312 of the optical path changing member 311 is changed by a fixed angle, to thereby correct the detection position of the laser light L detected by the line sensor 322f so as to return to the initial irradiation position.

[Correction of Irradiation Position Deviation of Laser Light in the Main Scanning Direction]

Figure 6A:
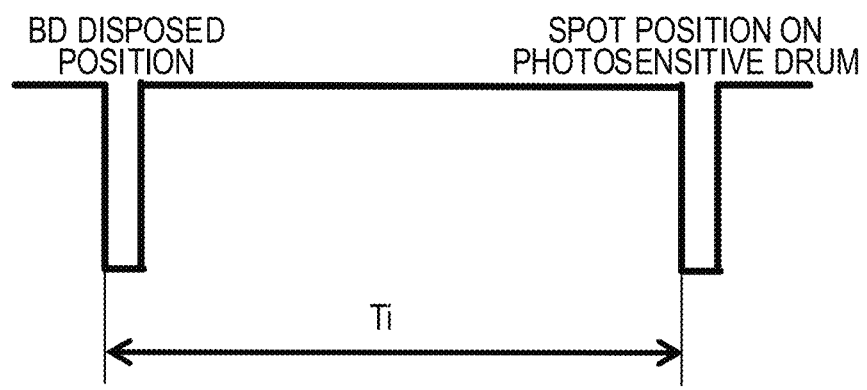
FIG. 6A and FIG. 6B are diagrams for illustrating a relationship between a position of a BD and a design spot position and an actual spot position on a line sensor in each of the first embodiment and the second embodiment.
Figure 6B:
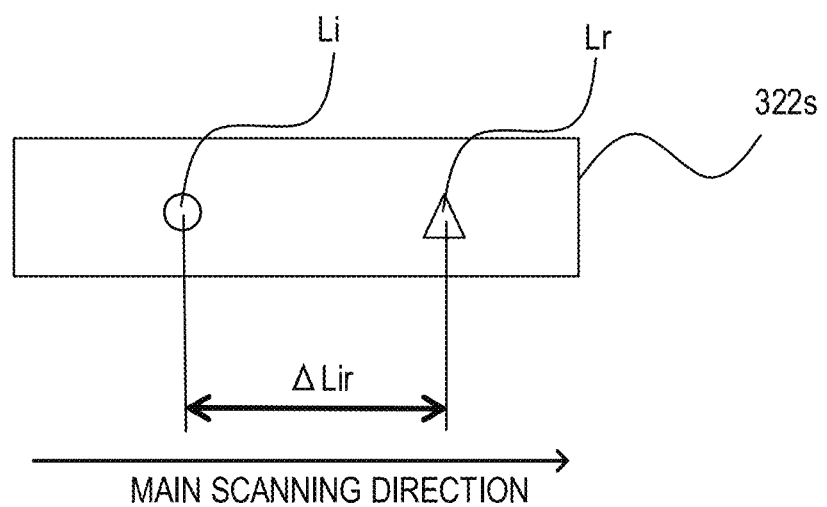

Next, a method of correcting the irradiation position of the laser light L in the main scanning direction is described. FIG. 6A is an illustration of a time Ti after the laser light L enters the BD 316 until a desired position in the main scanning direction of the photosensitive drum 11 for performing spot formation is reached. FIG. 6B is a diagram for illustrating a relationship between a desired design main scanning position at which the laser light is detected and a main scanning position at which the laser light is actually detected on the line sensor 322s of the sensor unit 322. In FIG. 6B, an irradiation position Li of the laser light L indicates the design irradiation position of the laser light L calculated based on the time Ti, and an irradiation position Lr indicates the irradiation position of the laser light L actually detected by the line sensor 322s. A positional deviation amount ΔLir indicates a distance between the design irradiation position of the laser light L on the line sensor 322s, which is calculated based on the time Ti, and the irradiation position of the laser light L actually detected by the line sensor 322s. In the first embodiment, the irradiation position deviation of the image actually formed on the photosensitive drum 11 in the main scanning direction is corrected through use of a timing at which the BD 316 detects the laser light as a reference.

As illustrated in FIG. 6A, the CPU 80 first determines a desired irradiation position of the laser light L to be detected by the line sensor 322s based on image data to be printed. Then, the CPU 80 calculates the design time Ti after the laser light L is detected by the BD 316 until the line sensor 322s is irradiated by the laser light L. Subsequently, the CPU 80 obtains the irradiation position Li on the line sensor 322s in the main scanning direction, at which the laser light L is to be detected, from the calculated design time Ti. Subsequently, the CPU 80 causes the laser light L to be emitted at a timing at which the time Ti has elapsed since the BD 316 detected the laser light L, and acquires, from the sensor unit 322, the irradiation position Lr at which the line sensor 322s has detected the laser light L. The CPU 80 calculates the positional deviation amount ΔLir between the irradiation position Lr acquired from the line sensor 322s of the sensor unit 322 and the design irradiation position Li on the line sensor 322s. The CPU 80 calculates a scanning deviation time ΔTir corresponding to the positional deviation amount ΔLir by dividing the calculated positional deviation amount ΔLir by a speed of scanning the surface of the photosensitive drum 11 with the laser light L. In FIG. 6B, the positional deviation amount ΔLir indicates that the actual laser light L deviates to a downstream side (right side of FIG. 6B) in the main scanning direction with the timing of scanning the photosensitive drum 11 being late. In view of this, the CPU 80 corrects a positional deviation of the laser light L in the main scanning direction by controlling the scanning optical device 2 so as to emit the laser light L at a timing obtained by advancing the emission timing of the laser light L by the scanning deviation time ΔTir. An example in which the actual laser light L deviates to the downstream side in the main scanning direction has been described above. For example, when the actual laser light L deviates to an upstream side (left side of FIG. 4B) in the main scanning direction, the CPU 80 can correct the positional deviation of the laser light L in the main scanning direction by emitting the laser light L at a timing obtained by delaying the emission timing of the laser light L by the scanning deviation time ΔTir.

With the above-mentioned configuration, it is possible to detect the irradiation position deviation amounts of the laser light in the main scanning direction and the sub-scanning direction through use of the image data even at the time of printing. In addition, the irradiation position deviation can be corrected at the timing of the sheet gap at the time of printing, and hence it is possible to produce an effect of preventing the occurrence of downtime for correcting the irradiation position deviation. In the first embodiment, the irradiation position deviation is detected through use of the laser light emitted into the image area on the photosensitive drum to be subjected to the printing, and hence it is not required to increase a length of the photosensitive drum in the main scanning direction. As a result, it is possible to prevent the image forming apparatus from becoming larger in size.

As described above, according to the first embodiment, it is possible to suppress the increase in size of the image forming apparatus and the occurrence of downtime, which are involved in the detection and correction of the irradiation position deviation of the laser light on the photosensitive member.

Second Embodiment

In the first embodiment, the sensor unit configured to detect the laser light reflected by the photosensitive drum is provided at the position facing the central portion of the photosensitive drum. In a second embodiment, a method of detecting and correcting the irradiation position deviation when sensor units are provided at positions facing both end portions of the photosensitive drum and the central portion is described.

[Configuration of Sensor Units]

Figure 7A:
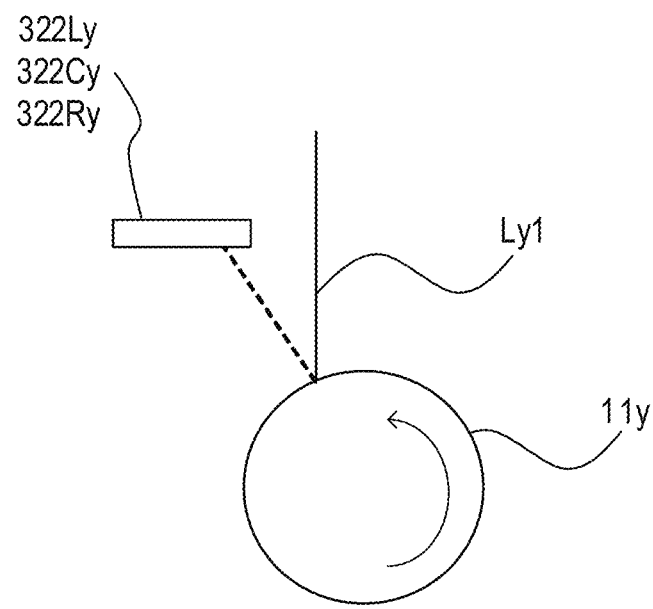
FIG. 7A and FIG. 7B are diagrams for illustrating a positional relationship among a sensor unit, a photosensitive drum, and laser light in the second embodiment.
Figure 7B:
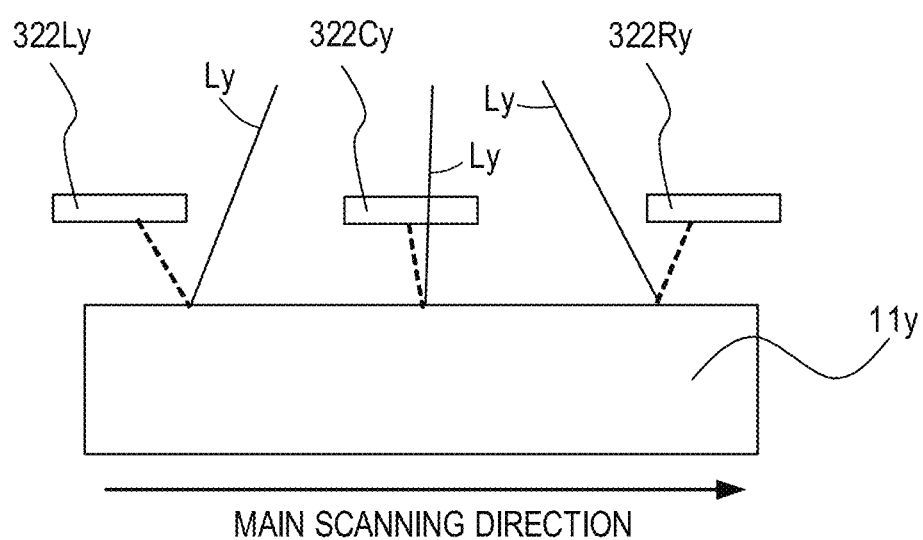

Next, FIG. 7A and FIG. 7B are diagrams for illustrating a positional relationship among the photosensitive drum 11, the laser light L, and sensor units 322L, 322C, and 322R configured to measure a scanning line position of the laser light L emitted from the scanning optical device 2. FIG. 7A is a diagram for illustrating the positional relationship among the sensor units 322L, 322C, and 322R, the photosensitive drum 11, and the laser light L as viewed when the process cartridge PY is cut along the plane perpendicular to the rotation shaft of the photosensitive drum 11y. FIG. 7B is a diagram for illustrating the positional relationship among the sensor units 322L, 322C, and 322R, the photosensitive drum 11, and the laser light L when the process cartridge PY is cut along the plane parallel to the rotation shaft of the photosensitive drum 11y. The process cartridges PY, PM, PC, and PK in the second embodiment have the same positional relationship among the photosensitive drum 11, the sensor units 322L, 322C, and 322R, and the laser light L irradiating the photosensitive drum 11. In the following description, a case of the process cartridge PY is described as a representative.

In the second embodiment, three sensor units 322Ly, 322Cy, and 322Ry are arranged for one photosensitive drum 11y. The sensor unit 322Ly (first detection portion) is arranged at a position facing the most upstream side of the photosensitive drum 11y in the main scanning direction, that is, the first irradiation position at which the laser light is emitted onto the photosensitive drum 11y. The sensor unit 322Cy (second detection portion) is arranged at a position facing the central portion of the photosensitive drum 11y in the main scanning direction, that is, the central portion on the photosensitive drum 11y. The sensor unit 322Ry (third detection portion) is arranged at a position facing the most downstream side of the photosensitive drum 11y in the main scanning direction, that is, the last irradiation position at which the laser light is emitted onto the photosensitive drum 11y. Each of the sensor units 322Ly, 322Cy, and 322Ry includes the line sensor 322f configured to measure the irradiation position of the laser light Ly with respect to the photosensitive drum 11y in the sub-scanning direction. In addition, each of the sensor units 322Ly, 322Cy, and 322Ry includes the line sensor 322s configured to measure the irradiation position of the laser light L with respect to the photosensitive drum 11y in the main scanning direction. The arrangement positions of the line sensor 322f and the line sensor 322s in each of the sensor units 322L, 322C, and 322R are the same as those of the first embodiment illustrated in FIG. 4B.

[Correction of Irradiation Position Deviation of Laser Light in Sub-Scanning Direction]

As illustrated in FIG. 7A and FIG. 7B, the laser lights Ly mirror-reflected by the surface of the photosensitive drum 11y enter the sensor units 322Ly, 322Cy, and 322Ry. The laser light Ly that has entered each of the sensor units 322Ly, 322Cy, and 322Ry enters the line sensor 322f being a sensor for the sub-scanning direction, and the line sensor 322f detects the irradiation position of the laser light Ly in the sub-scanning direction. In the second embodiment, in the same manner as in the first embodiment, the CPU 80 uses the correction table stored in the ROM 81 to acquire a positional deviation amount on the photosensitive drum 11 corresponding to the deviation amount from the reference position based on the detection position of the laser light L obtained by the line sensor 322f. Subsequently, in order to correct the acquired positional deviation amount on the photosensitive drum 11, the CPU 80 acquires an angle to be used for changing the angle of the flat glass 312 from the correction table stored in the ROM 81. Then, the CPU 80 instructs the sub-scanning irradiation position controller 85 about the acquired angle to be used for changing the angle of the flat glass 312. The sub-scanning irradiation position controller 85 changes the angle of the flat glass 312 to the instructed angle, to thereby complete the correction of the laser light L in the sub-scanning direction. In the second embodiment, in the same manner as in the first embodiment, the correction table is used for calculating the correction amount. As described in the first embodiment, in the second embodiment as well, the correction of the irradiation position deviation in the sub-scanning direction is performed prior to the correction of the irradiation position deviation in the main scanning direction.

In the second embodiment, the sensor units 322 are arranged at a total of three locations facing the central portion and the both end portions of the photosensitive drum 11. This enables a curvature and an inclination of the scanning line, which is the locus of the laser light L, to be calculated based on the irradiation positions in the sub-scanning direction detected by the line sensors 322f of the sensor units 322L, 322C, and 322R. In the second embodiment, in the same manner as in the first embodiment, the correction of the irradiation position deviation in the sub-scanning direction is performed by driving the stepping motor 315 to change the angle of the flat glass 312 of the optical path changing member 311. Thus, the angle cannot be changed at each of the both end portions and the central portion of the flat glass 312. In view of this, in the second embodiment, an average value of the irradiation position deviation amounts in the sub-scanning direction calculated based on the irradiation positions in the sub-scanning direction detected by the line sensors 322f of the sensor units 322L, 322C, and 322R is calculated, to thereby correct the positional deviation corresponding to the calculated average value.

[Correction of Irradiation Position Deviation of Laser Light in Main Scanning Direction]

In regard to the irradiation position in the main scanning direction, in the first embodiment, the irradiation position of the laser light L on the photosensitive drum 11 in the central portion near which the sensor unit 322 is arranged is detected. Meanwhile, in the second embodiment, the sensor units 322L, 322C, and 322R are arranged at the both end portions and the central portion of the photosensitive drum 11. Thus, through use of the timing at which the laser light L was detected by the BD 316 as a reference, it is possible to detect the irradiation of the laser light at the position on the most upstream side of the image area of the photosensitive drum 11 irradiated with the laser light L, the position at the central portion of the image area, and the position on the most downstream side of the image area. The method of detecting the laser light L by each of the sensor units 322L, 322C, and 322R is the same as the method using one sensor unit 322 in the first embodiment, and description thereof is omitted.

In the second embodiment, in the same manner as in FIG. 6B in the first embodiment, the CPU 80 calculates the positional deviation amount ΔLir between the irradiation position Lr acquired from the line sensor 322s of the sensor unit 322 and the design irradiation position Li on the line sensor 322s. The CPU 80 calculates the scanning deviation time ΔTir corresponding to the positional deviation amount ΔLir by dividing the calculated positional deviation amount ΔLir by the speed of scanning the surface of the photosensitive drum 11 with the laser light L. The CPU 80 corrects a positional deviation of the laser light L in the main scanning direction by controlling the scanning optical device 2 so as to emit the laser light L at a timing obtained by adjusting the emission timing of the laser light L by the scanning deviation time ΔTir. In the second embodiment, when the detected irradiation position deviation amounts in the main scanning direction are different among the sensor units 322L, 322C, and 322R, the average value of the detected irradiation position deviation amounts is calculated. Then, the laser light L is emitted from the scanning optical device 2 at a timing corrected based on the calculated average value.

In the second embodiment, the sensor units 322L and 322R are added at the positions facing the both end portions of the photosensitive drum 11, and hence it is possible to correct not only the above-mentioned irradiation start position of the laser light but also an overall magnification and a lateral difference in magnification (difference in image magnification between the upstream side and the downstream side in the scanning direction) of the image. Thus, it is possible to correct the irradiation position with higher accuracy than in the first embodiment. The overall magnification is corrected by the following method. That is, through use of the timing at which the laser light L was detected by the BD 316 as a reference, detection timings of the laser light L are acquired at the irradiation position on the most upstream side in the main scanning direction, which has been detected by the sensor unit 322L, and at the irradiation position on the most downstream side in the main scanning direction, which has been detected by the sensor unit 322R. Subsequently, a difference between the acquired detection timings is multiplied by the scanning speed of the laser light, to thereby calculate a distance from an image writing start position (position on the most upstream side in the main scanning direction) to an image writing end position (position on the most downstream side in the main scanning direction). Then, the calculated distance is compared with a design value being a design distance, and the light emission timing of the laser light L of the scanning optical device is changed so that the calculated distance becomes the same as the design value.

Meanwhile, the lateral difference in magnification is corrected by the following method. That is, through use of the timing at which the laser light L was detected by the BD 316 as a reference, detection timings of the laser light L are acquired at the irradiation position on the most upstream side in the main scanning direction, which has been detected by the sensor unit 322L, and at the irradiation position in the central portion in the main scanning direction, which has been detected by the sensor unit 322C. In addition, through use of the timing at which the laser light L was detected by the BD 316 as a reference, a detection timing of the laser light L at the irradiation position on the most downstream side in the main scanning direction, which has been detected by the sensor unit 322R, is acquired. Subsequently, a time difference between the irradiation time from the position on the most upstream side in the main scanning direction to the central portion in the main scanning direction and the design irradiation time and a time difference between the irradiation time from the central portion in the main scanning direction to the position on the most upstream side in the main scanning direction and the design irradiation time are calculated based on the acquired detection timings of the laser light L. The time difference (deviation amount) regarding the irradiation time on the upstream side in the main scanning direction and the time difference (deviation amount) regarding the irradiation time on the downstream side are compared with each other, and the light emission timing of the laser light L of the scanning optical device is changed so that both the deviation amounts become the same.

As described above, the sensor units are installed at the positions facing the both end portions and the central portion of the photosensitive drum 11, to thereby enable more accurate detection and correction of the irradiation position deviation. In the second embodiment, in the same manner as in the first embodiment, it is possible to detect and correct the irradiation position deviation even at the time of printing without causing downtime. In addition, also in the second embodiment, the irradiation position deviation is detected through use of the laser light emitted into the image area on the photosensitive drum to be subjected to the printing, and hence it is not required to increase a length of the photosensitive drum in the main scanning direction. As a result, it is possible to prevent the image forming apparatus from becoming larger in size.

As described above, according to the second embodiment, it is possible to suppress the increase in size of the image forming apparatus and the occurrence of downtime, which are involved in the detection and correction of the irradiation position deviation of the laser light on the photosensitive member.

Third Embodiment

In the first and second embodiments, the line sensors are provided to each sensor unit configured to detect the laser light. In a third embodiment, methods of detecting and correcting the irradiation position deviation when the sensor unit configured to detect the laser light is provided with an area sensor capable of detecting the irradiation positions of the laser light in the sub-scanning direction and the main scanning direction with one sensor are described.

[Control of Scanning Optical Device]

Figure 8A:
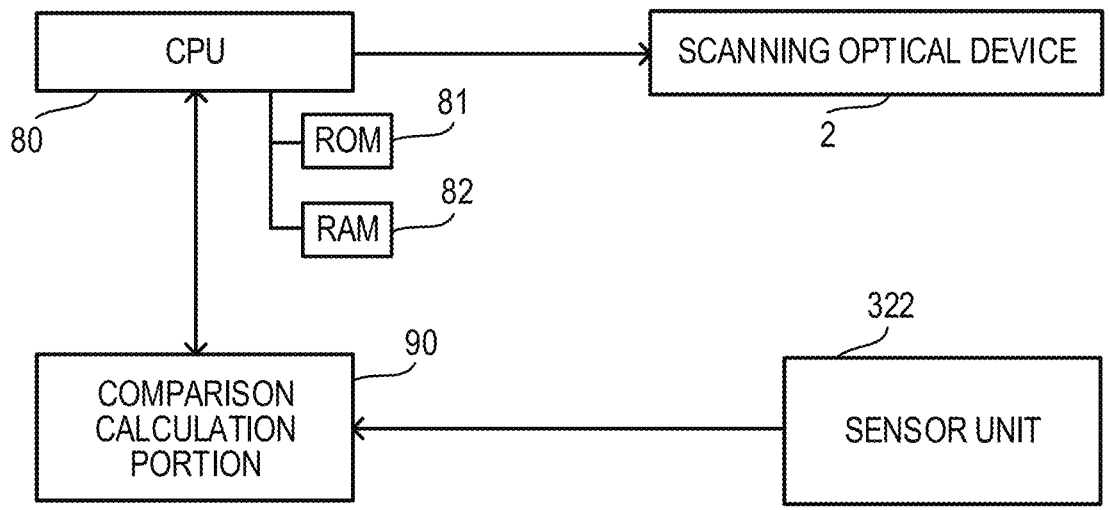
FIG. 8A, FIG. 8B, and FIG. 8C are diagrams for illustrating a positional relationship among a sensor unit, a photosensitive drum, and laser light in the third embodiment.

FIG. 8A is a diagram for illustrating a configuration of a control system configured to control the scanning optical device in the third embodiment. The configuration illustrated in FIG. 8A is different from the configuration of the control system configured to control the scanning optical device in the cases of the first and second embodiments illustrated in FIG. 4A in that the sub-scanning irradiation position controller 85 and the optical path changing member 311 are removed and that a comparison calculation portion 90 is added.

In the third embodiment, the sensor unit 322 includes the area sensor instead of the line sensors, and hence can simultaneously detect the irradiation positions of the laser light L in the main scanning direction and the sub-scanning direction with one sensor. In addition, in the first and second embodiments, the CPU 80 calculates the positional deviation amounts of the irradiation positions of the laser light L in the main scanning direction and the sub-scanning direction. In the third embodiment, the comparison calculation portion 90 calculates the positional deviation amounts of the irradiation positions of the laser light L in the main scanning direction and the sub-scanning direction. A method of calculating the positional deviation of the irradiation position is described later in detail. In the configuration of the third embodiment, the sub-scanning irradiation position controller 85 and the optical path changing member 311 are not provided, and hence the positional deviation in the sub-scanning direction is corrected by changing the emission timing of the laser light L of the scanning optical device 2 for the image data that has caused the positional deviation. A configuration of the sensor unit 322 in the third embodiment is described in detail later.

[Configuration of Sensor Units]

Figure 8B:
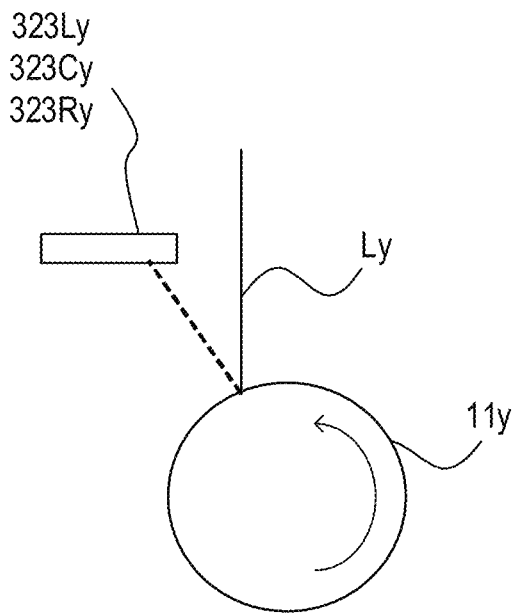
Figure 8C:
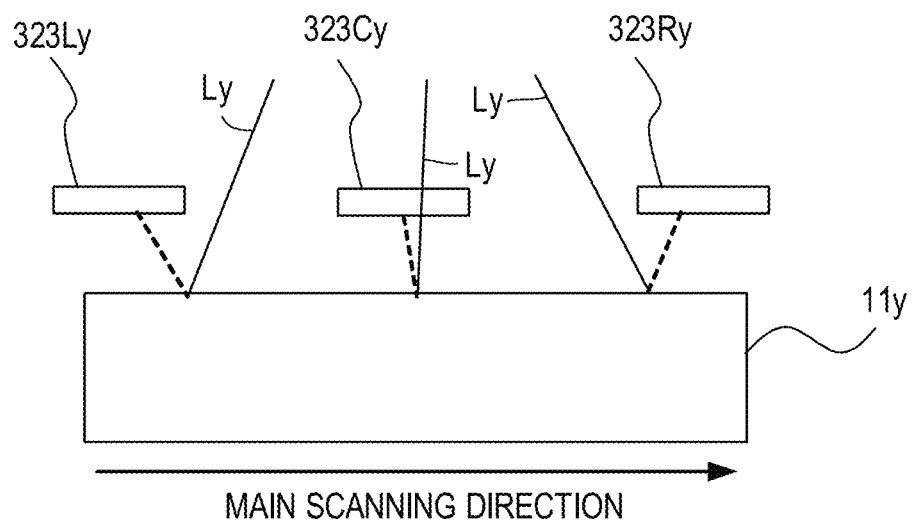

Next, FIG. 8B and FIG. 8C are diagrams for illustrating a positional relationship among the photosensitive drum 11, the laser light L, and sensor units 323Ly, 323Cy, and 323Ry configured to measure a scanning line position of the laser light L emitted from the scanning optical device 2. FIG. 8B is a diagram for illustrating the positional relationship among the sensor units 323Ly, 323Cy, and 323Ry, the photosensitive drum 11, and the laser light L as viewed when the process cartridge PY is cut along the plane perpendicular to the rotation shaft of the photosensitive drum 11y. FIG. 8C is a diagram for illustrating the positional relationship among the sensor units 323Ly, 323Cy, and 323Ry, the photosensitive drum 11, and the laser light L when the process cartridge PY is cut along the plane parallel to the rotation shaft of the photosensitive drum 11y. The process cartridges PY, PM, PC, and PK in the third embodiment have the same positional relationship among the photosensitive drum 11, the sensor units 323Ly, 323Cy, and 323Ry, and the laser light L irradiating the photosensitive drum 11. In the following description, a case of the process cartridge PY is described as a representative.

Figure 9:
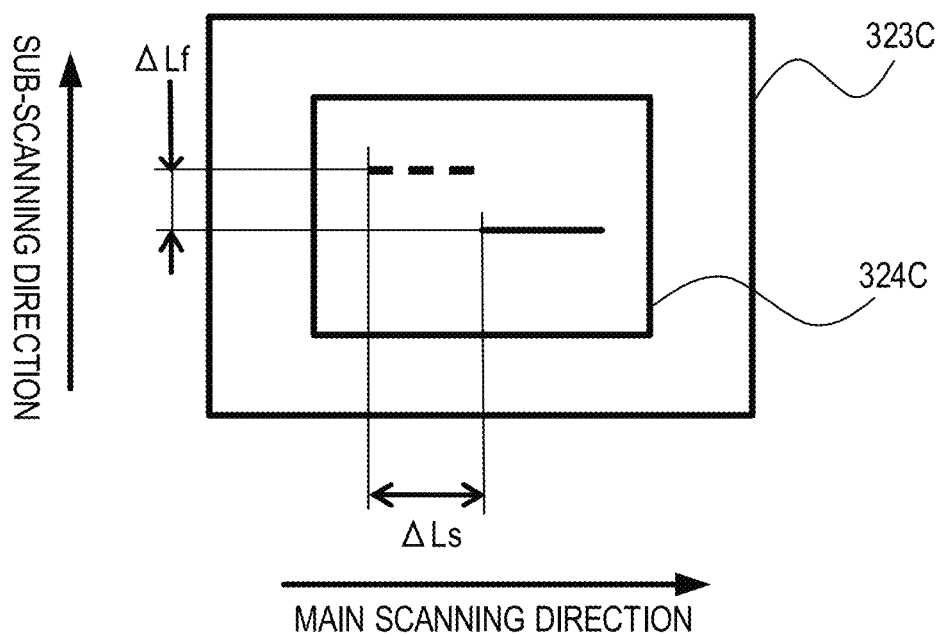
FIG. 9 is a diagram for illustrating the sensor unit in the third embodiment.

In the third embodiment, three sensor units 323Ly, 323Cy, and 323Ry are arranged for one photosensitive drum 11y. The sensor unit 323Ly is arranged at a position facing the most upstream side of the photosensitive drum 11y in the main scanning direction, that is, the first irradiation position at which the laser light is emitted onto the photosensitive drum 11y. The sensor unit 323Cy is arranged at a position facing the central portion of the photosensitive drum 11y in the main scanning direction, that is, the central portion on the photosensitive drum 11y. The sensor unit 323Ry is arranged at a position facing the most downstream side of the photosensitive drum 11y in the main scanning direction, that is, the last irradiation position at which the laser light is emitted onto the photosensitive drum 11y. Each of the sensor units 323Ly, 323Cy, and 323Ry includes a two-dimensional area sensor 324, which is illustrated in FIG. 9, and can simultaneously measure the irradiation positions of the laser light Ly with respect to the photosensitive drum 11y in the sub-scanning direction and the main scanning direction. The sensor units 323Ly, 323Cy, and 323Ry have the same method of measuring the irradiation positions of the laser light L through use of the area sensor 324, and hence the following description is given by taking the sensor unit 323C as a representative.

[Area Sensor]

FIG. 9 is a schematic diagram for illustrating an area sensor 324C provided to the sensor unit 323C in the third embodiment. As illustrated in FIG. 9, the sensor unit 323C is provided with the area sensor 324C being a large-sized sensor panel, and can simultaneously detect the irradiation positions of the entering laser light L in the sub-scanning direction and the main scanning direction through use of the area sensor 324C. In FIG. 9, the up-down direction indicates the sub-scanning direction, and the left-right direction indicates the main scanning direction.

In addition, the solid line on the area sensor 324C of FIG. 9 indicates a scanning line (locus of the laser light L entering the area sensor 324C) obtained by plotting the design laser light L irradiating the surface of the area sensor 324C after being reflected by the surface of the photosensitive drum 11. Meanwhile, the broken line on the area sensor 324C of FIG. 9 indicates a scanning line (locus of the laser light L entering the area sensor 324C) obtained by plotting how the actual laser light L emitted at the same timing as the design laser light L irradiates the surface of the area sensor 324C.

In FIG. 9, ΔLs represents an irradiation position deviation amount in the main scanning direction between the design laser light L and the actual laser light L, and ΔLf represents an irradiation position deviation amount in the sub-scanning direction between the design laser light L and the actual laser light L. In FIG. 9, the left side is the upstream side in the main scanning direction, the right side is the downstream side in the main scanning direction, the upper side is the upstream side in the sub-scanning direction, and the lower side is the downstream side in the sub-scanning direction. Thus, it can be understood that the actual laser light L is emitted at a timing earlier than that of the design laser light L in both the sub-scanning direction and the main scanning direction. In view of this, in order to match the scanning line of the actual laser light L with the scanning line of the design laser light L, the emission timing of the laser light L may be corrected to a timing later by the positional deviation amount ΔLf in the sub-scanning direction and later by the positional deviation amount ΔLs in the main scanning direction. The above description of the correction method is directed to the sensor unit 323C, but the same applies to the sensor units 323L and 323R. In addition, as described above, in the third embodiment, the irradiation position is corrected in the sub-scanning direction not by changing the optical path itself of the laser light L as in the first and second embodiments but by adjusting the light emission timing of the laser light L corresponding to the image data. Further, in the case of the first embodiment, there is only one sensor unit 322, and hence the irradiation positions in the sub-scanning direction are uniformly corrected at the all image heights. Meanwhile, in the third embodiment, the sensor units 323 are arranged at a total of three locations facing the both end portions and the central portion of the photosensitive drum 11, and hence correction values for the curvature and the inclination of the scanning line involved in the irradiation with the laser light L can be calculated based on the irradiation positions of the laser light L in the sub-scanning direction.

[Calculation of Irradiation Position Deviation Amount]

Figure 10:
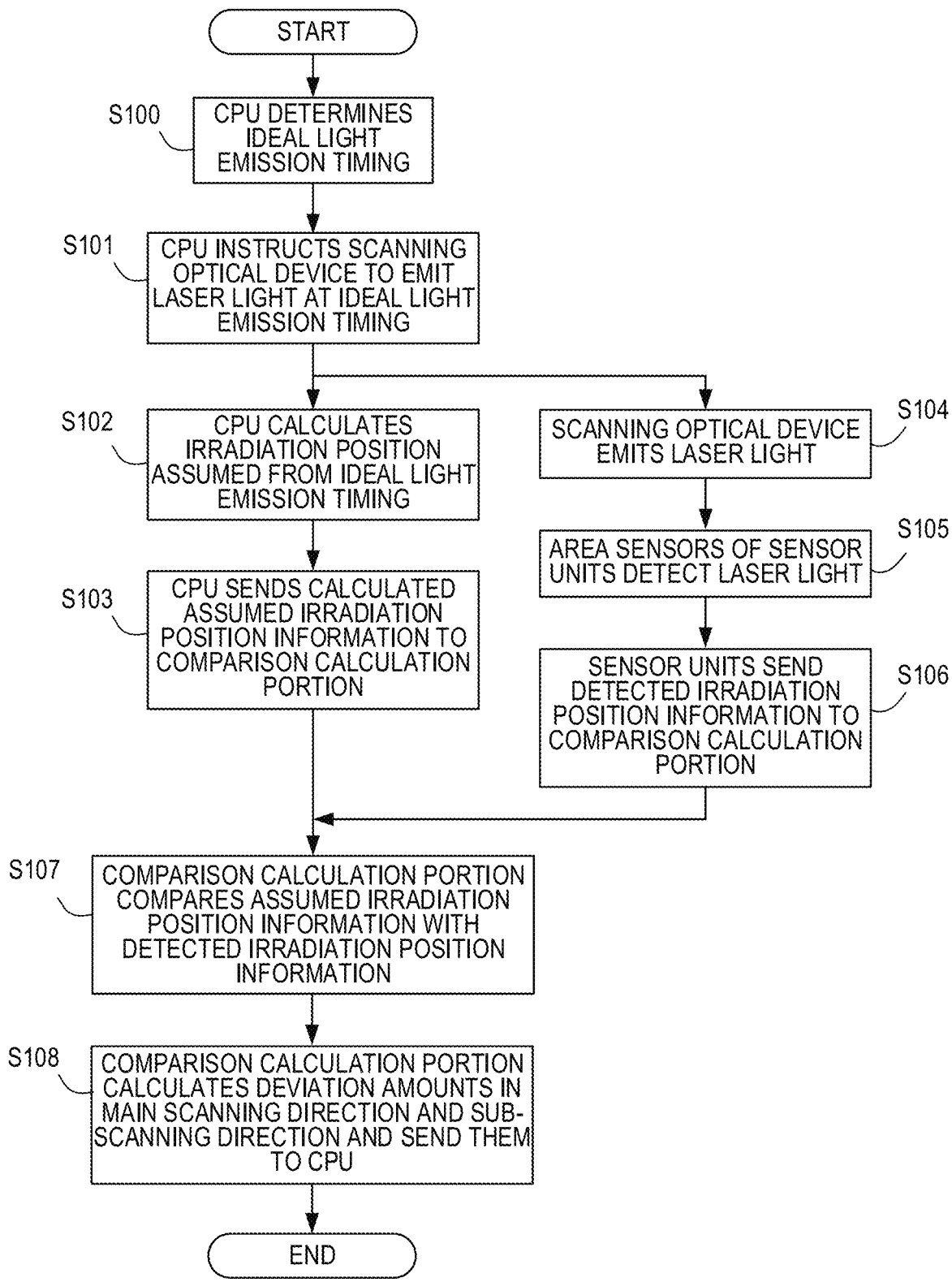
FIG. 10 is a flow chart for illustrating a control sequence for calculating an irradiation position deviation in a sub-scanning direction and a main scanning direction in the third embodiment.

FIG. 10 is a flow chart for illustrating a control sequence for calculating the irradiation position deviation amounts in the main scanning direction and the sub-scanning direction. The irradiation position deviation amount is calculated based on irradiation positional information obtained by the area sensor 324 of the sensor unit 323 detecting the laser light L reflected by the photosensitive drum 11 after irradiating the photosensitive drum 11. Thus, the control sequence illustrated in FIG. 10 can be performed even when image formation is being performed.

In Step (hereinafter referred to as S) 100, the CPU 80 determines, from the image data for image formation, a design light emission timing (hereinafter referred to as "ideal light emission timing") at which the laser light L emitted from the scanning optical device 2 is to be detected by the area sensor 324. The ideal light emission timing uses the timing at which the laser light L was detected by the BD 316 as a reference. In S101, the CPU 80 instructs the scanning optical device 2 to emit the laser light L corresponding to the image data at the timing determined in S100. In S102, the CPU 80 calculates the irradiation positions of the emitted laser light L to be detected in the sub-scanning direction and the main scanning direction by the area sensor 324 of each of the sensor units 323L, 323C, and 323R when the laser light L is emitted from the scanning optical device 2 at the ideal light emission timing. In S103, the CPU 80 sends, to the comparison calculation portion 90, irradiation positional information (assumed irradiation positional information) on the laser light L to be detected in the sub-scanning direction and the main scanning direction by the area sensor 324 of each of the sensor units 323L, 323C, and 323R, which is calculated in S102.

In S104, the scanning optical device 2 emits the laser light L corresponding to the image data at the timing instructed by the CPU 80. In S105, the area sensor 324 of each of the sensor units 323L, 323C, and 323R detects the laser light L emitted from the scanning optical device 2 in S104. In S106, each of the sensor units 323L, 323C, and 323R sends, to the comparison calculation portion 90, irradiation positional information (detected irradiation positional information) on the laser light L detected in the sub-scanning direction and the main scanning direction by the area sensor 324.

In S107, the comparison calculation portion 90 compares the assumed irradiation positional information sent from the CPU 80 in S103 with the detected irradiation positional information sent from each of the sensor units 323L, 323C, and 323R in S106. As a result, the comparison calculation portion 90 calculates the irradiation position deviation amounts in the sub-scanning direction and the main scanning direction in the area sensor 324 of each of the sensor units 323L, 323C, and 323R. In S108, the comparison calculation portion 90 sends the irradiation position deviation amounts in the sub-scanning direction and the main scanning direction calculated in S107 to the CPU 80, to thereby complete calculation processing for the irradiation position deviation amounts.

In this case, the comparison calculation portion 90 calculates the irradiation position deviation amounts in the sub-scanning direction and the main scanning direction. For example, the CPU 80 may be configured to acquire the detected irradiation positional information from each of the sensor units 323L, 323C, and 323R, and to calculate the irradiation position deviation amounts in the sub-scanning direction and the main scanning direction based on the assumed irradiation positional information calculated in advance by the CPU 80.

[Correction of Irradiation Position Deviation]

Figure 11:
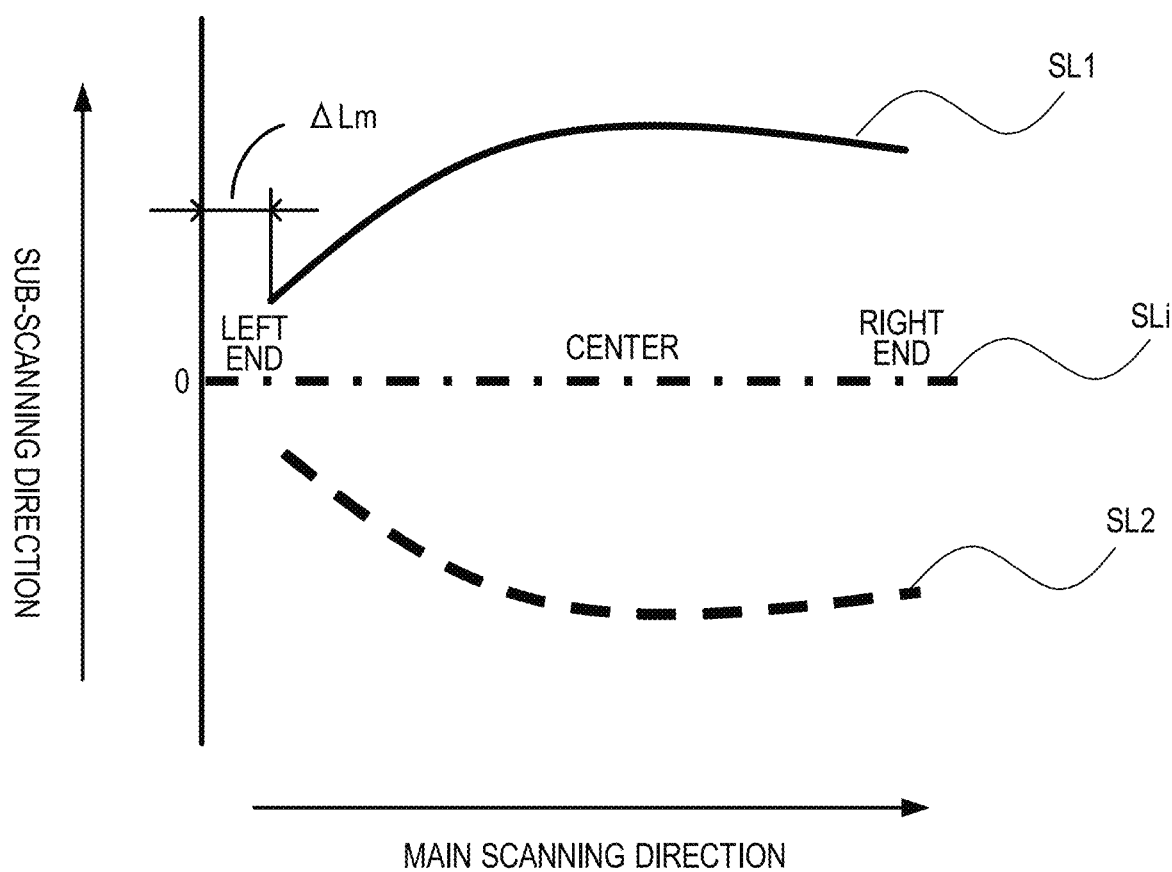
FIG. 11 is a diagram for illustrating irradiation position correction in the sub-scanning direction in the third embodiment.

FIG. 11 is a diagram for illustrating a method of correcting the positional deviation of the laser light L in the sub-scanning direction. In FIG. 11, the up-down direction indicates the sub-scanning direction, the upper side indicates the upstream side in the sub-scanning direction, and the lower side indicates the downstream side in the sub-scanning direction. Meanwhile, the left-right direction indicates the main scanning direction, the left side indicates the upstream side in the main scanning direction, and the right side indicates the downstream side in the main scanning direction.

A curved line SL1 (hereinafter referred to as "scanning curvature curved line SL1") indicated by the solid line of FIG. 11 represents a scanning line indicating a locus of the actual laser light L detected by the area sensor 324, and indicates that the scanning line has been curved on the photosensitive drum 11 to cause an inclination. The scanning curvature curved line SL1 is a curved line approximated to a quadratic function based on the positional deviation amounts in the sub-scanning direction and the main scanning direction in the area sensor 324 of each of the sensor units 323L, 323C, and 323R sent from the comparison calculation portion 90. An ideal line SLi indicated by the one-dot chain line represents a scanning line indicating a locus of the laser light L emitted from the scanning optical device 2 at the ideal light emission timing, and due to being a design scanning line, is a straight line having no positional deviation in the sub-scanning direction and the main scanning direction. A curved line SL2 (hereinafter referred to as "scanning curvature canceling curved line SL2") indicated by the broken line represents a curved line being line-symmetric to the scanning curvature curved line SL1 with respect to the ideal line SLi. From FIG. 11, the scanning curvature curved line SL1 is illustrated upstream of the ideal line SLi in the sub-scanning direction, and hence it can be understood that the emission timing of the laser light L in the sub-scanning direction is earlier.

In addition, in FIG. 11, ΔLm indicates the irradiation position deviation amount of the scanning curvature curved line SL1 in the main scanning direction with respect to the ideal line SLi. From FIG. 11, the scanning curvature curved line SL1 deviates to the downstream side of the ideal line SLi in the main scanning direction, and hence it can be understood that the emission timing of the laser light L in the main scanning direction is later.

As a result, in regard to the irradiation position deviation amount in the main scanning direction, the CPU 80 performs the correction by instructing the scanning optical device 2 to emit the laser light L at a timing earlier by the time obtained by dividing the positional deviation amount ΔLm by the scanning speed of the laser light L of the scanning optical device 2. Meanwhile, in regard to the positional deviation amount in the sub-scanning direction, the light emission timing of the laser light L in the sub-scanning direction, which corresponds to a given piece of image data, is changed based on the positional deviation amount in the sub-scanning direction for each piece of image data, that is, for each position in the main scanning direction corresponding to the image data. Specifically, the signal of the image data emitted by the laser light L in the same main scanning direction at the design timing is emitted by, for example, the next laser light in the main scanning direction or the further next laser light in the main scanning direction depending on the positional deviation amount in the sub-scanning direction. In this manner, the emission timing of the image data in the sub-scanning direction is changed depending on the image position in the main scanning direction. Thus, the above-mentioned scanning curvature canceling curved line SL2 can be drawn, and the irradiation position deviation in the sub-scanning direction can be corrected. In the second embodiment, the same method as the method in the third embodiment can be used to correct the irradiation position deviation in the sub-scanning direction.

As described above, the sensor units are installed at the positions facing both end portions and the central portion of the photosensitive drum 11, to thereby enable more accurate detection and correction of the irradiation position deviation. In the third embodiment, in the same manner as in the first embodiment, it is possible to detect and correct the irradiation position deviation even at the time of printing without causing downtime. In the third embodiment as well, the irradiation position deviation is detected through use of the laser light emitted into the image area on the photosensitive drum to be subjected to the printing, and hence it is not required to increase the length of the photosensitive drum in the main scanning direction. As a result, it is possible to prevent the image forming apparatus from becoming larger in size. In addition, in the third embodiment, the image data itself is changed so that the emission timing of the image data in the sub-scanning direction matches the irradiation position on the photosensitive drum 11 along the shape of the scanning curvature canceling curved line SL2. Thus, the scanning line curvature and the inclination in the sub-scanning direction can be corrected by performing printing through use of the changed image data. The above-mentioned correction method enables reduction of the irradiation position deviation by changing the emission timing of the image data in the sub-scanning direction without changing the optical path of the laser light itself.

As described above, according to the third embodiment, it is possible to suppress the increase in size of the image forming apparatus and the occurrence of downtime, which are involved in the detection and correction of the irradiation position deviation of the laser light on the photosensitive member.

Another Embodiment

Figure 12A:
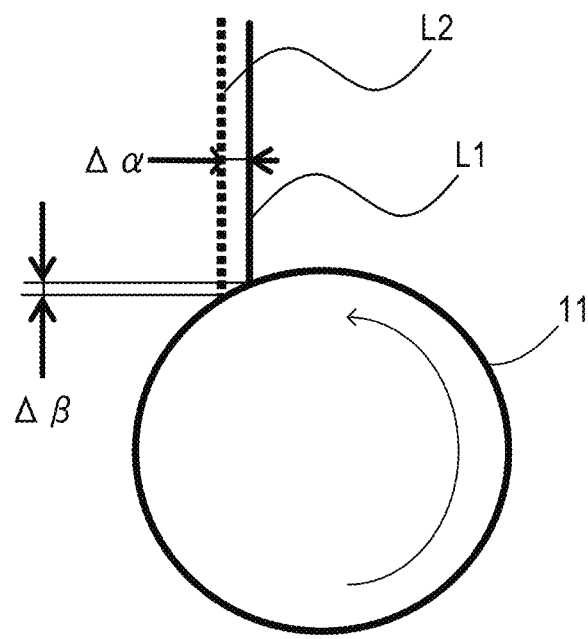
FIG. 12A and FIG. 12B are diagrams for illustrating the irradiation position deviation in the main scanning direction in a case of a multi-beam light source in another embodiment.
Figure 12B:
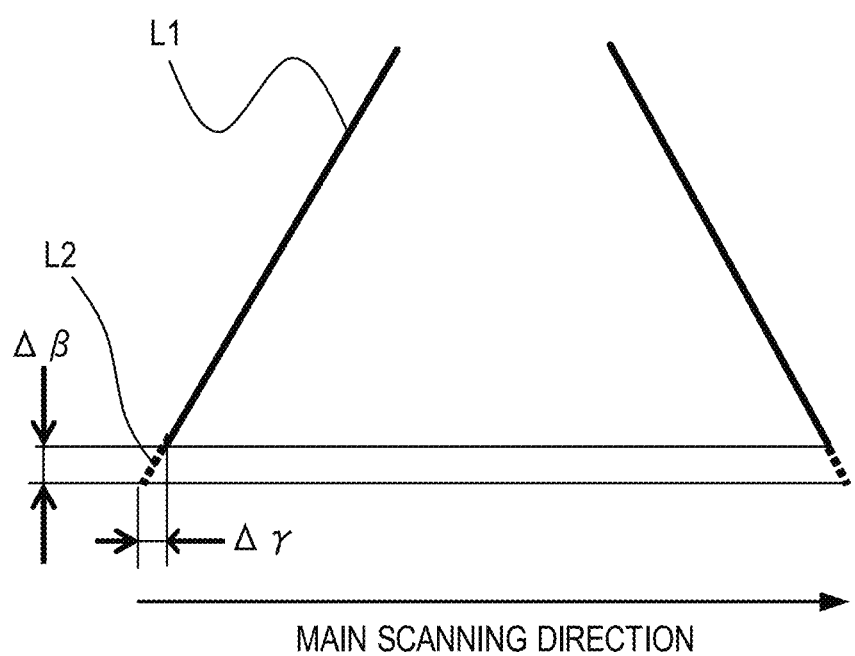

Now, the correction of the irradiation position deviation using a multi-beam light source is described with reference to the configuration of each of the first to third embodiments described above. FIG. 12A and FIG. 12B are diagrams for illustrating causes of occurrences of the curvature of the photosensitive drum 11 and the irradiation position deviation of the laser light in the main scanning direction, which occur when a two-beam laser element configured to emit two laser lights L1 and L2 is used for the semiconductor laser being a light emitting element of the light source portion 302. FIG. 12A is a diagram for illustrating a positional relationship between the laser lights L1 and L2 and the photosensitive drum 11 as viewed when the photosensitive drum 11 is cut along a plane perpendicular to the rotation shaft of the photosensitive drum 11. In FIG. 12A, the laser light indicated by the solid line is the laser light L1, and the laser light indicated by the broken line is the laser light L2. Meanwhile, FIG. 12B is an illustration of the irradiation position deviation on the photosensitive drum 11 in the main scanning direction, which is exhibited when an optical path length difference occurs between the two laser lights L1 and L2. In FIG. 12B, the laser light indicated by the solid line is the laser light L1, and the laser light indicated by the broken line is the laser light L2.

As illustrated in FIG. 12A, at the position at which the photosensitive drum 11 is irradiated with the laser light, the two laser lights L1 and L2 have their optical paths arranged so that the laser lights L1 and L2 do not normally face the photosensitive drum 11. The laser lights L1 and L2 are emitted onto the photosensitive drum 11 with a distance $\Delta\alpha$ being provided between the two laser lights L1 and L2. This causes an optical path length difference $\Delta\beta$ between optical path lengths of the laser light L1 and the laser light L2 before reaching the surface of the photosensitive drum 11. In addition, as the two laser lights L1 and L2 are farther apart from the positions normally facing the surface of the photosensitive drum 11, the curvature of the photosensitive drum 11 becomes larger. As a result, the optical path length difference $\Delta\beta$ between the laser light L1 and the laser light L2 becomes larger.

FIG. 12B is a diagram for illustrating the laser lights L1 and L2 irradiating the surface of the photosensitive drum 11. The laser lights L1 and L2 are emitted onto the surface of the photosensitive drum 11 at the distance $\Delta\alpha$, but are emitted onto the surface of the photosensitive drum 11 at the same angle. Thus, in FIG. 12B, the optical paths of the laser lights L1 and L2 overlap each other (in FIG. 12B, the optical path of the laser light L2 (broken line) is hidden by the optical path of the laser light L1 (solid line)). However, as described above, the optical path length of the laser light L2 is longer than the optical path length of the laser light L1 by $\Delta\beta$. As a result, the length of the laser light L2 in the main scanning direction is longer than that of the laser light L1 by $\Delta\gamma$, and the irradiation position deviation has occurred. Then, when the irradiation position deviation of the laser lights L1 and L2 in the sub-scanning direction occurs and the optical path length difference $\Delta\beta$ between the two laser lights becomes larger, $\Delta\gamma$ being the irradiation position deviation amount of the two laser lights in the main scanning direction further increases.

In view of this, the configuration of each of the first to third embodiments described above is used to correct the irradiation position deviation of the laser lights L1 and L2 in the sub-scanning direction, and hence it is possible to reduce the irradiation position deviation $\Delta\gamma$ of the laser light in the main scanning direction, which occurs due to the relationship between the drum curvature and the laser light irradiation position in the sub-scanning direction. This enables reduction of an occurrence of moire. In another embodiment, the two-beam laser element is used as the semiconductor laser, but even in a case of a semiconductor laser having, for example, four beams, it is possible to reduce the occurrence of moire in the same manner.

As described above, according to another embodiment, it is possible to suppress the increase in size of the image forming apparatus and the occurrence of downtime, which are involved in the detection and correction of the irradiation position deviation of the laser light on the image bearing member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-044018, filed Mar. 13, 2020, which is hereby incorporated by reference herein in its entirety.

What is claimed is:

1. An image forming apparatus, comprising;
   a photosensitive member;
   a scanning optical unit configured to scan the photosensitive member by laser light according to image information, the scanning optical unit including a light source configured to emit the laser light, a rotary polygon mirror configured to deflect the laser light, and a housing configured to hold the light source and the rotary polygon mirror;
   a control unit configured to control the scanning optical unit; and
   a detection unit which is arranged in a position facing the photosensitive member, and is configured to output positional information of the laser light, the detection unit including a detection portion into which the laser light reflected by the photosensitive member is incident,
   wherein the control unit calculates a positional deviation amount of an irradiation position on the photosensitive member which is irradiated by the laser light based on the positional information output by the detection unit, and controls the scanning optical unit to correct the positional deviation of the irradiation position of the laser light,
   wherein the detection unit is arranged in the position facing a central portion of the photosensitive member in a main scanning direction,
   wherein the detection portion includes a first line sensor configured to detect a position of the laser light in a sub-scanning direction, and a second line sensor configured to detect a position of the laser light in the main scanning direction, and
   wherein the control unit corrects a positional deviation amount of an irradiation position of the laser light in the sub-scanning direction calculated based on positional information obtained by the first line sensor, and thereafter corrects a positional deviation amount of an irradiation position of the laser light in the main scanning direction calculated based on positional information obtained by the second line sensor.

2. The image forming apparatus according to claim 1, wherein the control unit calculates the positional deviation amount of the irradiation position of the laser light on the photosensitive member based on a deviation amount between the positional information and a reference position.

3. The image forming apparatus according to claim 1, further comprising a storage unit configured to store first information which makes a deviation amount between a position in which the first line sensor has detected the laser light and the reference position, correspond to a positional deviation amount in the sub-scanning direction of an irradiation position of the laser light on the photosensitive member,
   wherein the control unit calculates the positional deviation amount in the sub-scanning direction of the irradiation position of the laser light on the photosensitive member based on the first information stored in the storage unit and the deviation amount between the position in which the first line sensor has detected the laser light and the reference position.

4. The image forming apparatus according to claim 1, wherein the scanning optical unit includes an optical path changing portion configured to change an optical path of the laser light, wherein the optical path changing portion includes a flat glass into which the laser light emitted from the scanning optical unit is incident, and a drive member configured to rotate the flat glass to change an angle of the flat glass, and wherein the control unit changes the angle of the flat glass based on the positional deviation amount to correct a positional deviation in a sub-scanning direction of an irradiation position of the laser light on the photosensitive member.

\* \* \* \* \*